United States Patent
Duncan et al.

(10) Patent No.: US 11,796,116 B2
(45) Date of Patent: Oct. 24, 2023

(54) SYSTEMS AND METHODS FOR MAINTAINING PIPES

(71) Applicant: General Electric Company, Schenectady, NY (US)

(72) Inventors: Alexander Kyle Duncan, Niskayuna, NY (US); Todd William Danko, Niskayuna, NY (US); Justin Foehner, Niskayuna, NY (US); Yakov Polishchuk, Niskayuna, NY (US); Douglas R. Forman, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 807 days.

(21) Appl. No.: 16/751,790

(22) Filed: Jan. 24, 2020

(65) Prior Publication Data

US 2021/0025535 A1    Jan. 28, 2021

Related U.S. Application Data

(60) Provisional application No. 62/877,386, filed on Jul. 23, 2019.

(51) Int. Cl.
    *B08B 9/027*      (2006.01)
    *F16L 55/44*      (2006.01)
    (Continued)

(52) U.S. Cl.
CPC ............ *F16L 55/44* (2013.01); *B08B 7/0042* (2013.01); *B08B 9/049* (2013.01); *B08B 9/051* (2013.01);
(Continued)

(58) Field of Classification Search
CPC . F16L 55/44; F16L 55/30; F16L 55/32; F16L 55/34; F16L 55/48; F16L 2101/30
(Continued)

(56) References Cited

U.S. PATENT DOCUMENTS

| 2,579,813 A | 12/1951 | Frank |
| 3,495,626 A | 2/1970 | Nagel |

(Continued)

FOREIGN PATENT DOCUMENTS

| CN | 105834586 B | 12/2017 |
| KR | 101993733 B1 | 6/2019 |

OTHER PUBLICATIONS

O. Tatar et al., "Development of mobile mini robots for in pipe inspection tasks", Mechanika, pp. 60-64, ISSN 1392-1207, Nr.6(68), Sep. 5, 2007.

(Continued)

*Primary Examiner* — James F Hook
(74) *Attorney, Agent, or Firm* — Armstrong Teasdale LLP

(57) ABSTRACT

A system for use in maintaining a pipe having a sidewall is provided. The system includes a motorized apparatus sized to fit within the pipe and configured to travel along the pipe through an interior cavity. The motorized apparatus includes a plurality of leg assemblies coupled circumferentially around a body assembly. The body assembly includes an actuator assembly coupled to each leg assembly and configured to independently actuate each leg assembly to adjust a position of each leg assembly. The body assembly also includes at least one sensor configured to collect information associated with the position of each leg assembly. The body assembly also includes a controller communicatively coupled to the motorized apparatus and configured to receive the information from the sensor, and to determine at least one of a pipe diameter and a pitch of the motorized (Continued)

apparatus based on the information from the at least one sensor.

20 Claims, 18 Drawing Sheets

(51) Int. Cl.
  *B08B 9/049* (2006.01)
  *F16L 55/30* (2006.01)
  *F16L 55/32* (2006.01)
  *B08B 7/00* (2006.01)
  *B08B 9/051* (2006.01)
  *F16L 55/34* (2006.01)
  *F16L 55/48* (2006.01)
  *F16L 101/12* (2006.01)
  *F16L 101/20* (2006.01)
  *F16L 101/30* (2006.01)

(52) U.S. Cl.
  CPC .............. *F16L 55/30* (2013.01); *F16L 55/32* (2013.01); *F16L 55/34* (2013.01); *F16L 55/48* (2013.01); *B08B 2209/04* (2013.01); *F16L 2101/12* (2013.01); *F16L 2101/20* (2013.01); *F16L 2101/30* (2013.01)

(58) Field of Classification Search
  USPC ................ 138/97; 15/104.05; 405/184.3; 134/22.11
  See application file for complete search history.

(56) References Cited

U.S. PATENT DOCUMENTS

| | | | |
|---|---|---|---|
| 3,525,111 A | 8/1970 | Von Arx | |
| 3,761,623 A * | 9/1973 | Hara | H04N 7/183 |
| | | | 348/E7.087 |
| 4,177,734 A * | 12/1979 | Rhoden | B08B 9/049 |
| | | | 118/317 |
| 4,475,260 A | 10/1984 | Beck | |
| 4,537,136 A | 8/1985 | Douglas | |
| 5,423,630 A | 6/1995 | Imoto et al. | |
| 5,878,783 A | 3/1999 | Smart | |
| 6,107,795 A | 8/2000 | Smart | |
| 6,371,631 B1 | 4/2002 | Reutemann | |
| 6,514,346 B1 | 2/2003 | Nichols | |
| 6,820,653 B1 | 11/2004 | Schempf et al. | |
| 7,182,025 B2 | 2/2007 | Ghorbel et al. | |
| 7,210,364 B2 | 5/2007 | Ghorbel et al. | |
| 7,328,475 B2 | 2/2008 | Smith et al. | |
| 7,597,048 B2 | 10/2009 | Nicholson | |
| 7,812,328 B2 | 10/2010 | Betz | |
| 9,021,900 B2 | 5/2015 | Yang et al. | |
| 9,656,389 B2 | 5/2017 | Skrinde | |
| 11,415,553 B2 | 8/2022 | Howland | |
| 11,560,977 B2 * | 1/2023 | Duncan | F16L 55/34 |
| 2002/0190682 A1 | 12/2002 | Schempf et al. | |
| 2003/0039752 A1 | 2/2003 | Winiewicz et al. | |
| 2004/0173116 A1 | 9/2004 | Ghorbel et al. | |
| 2005/0223825 A1 * | 10/2005 | Janssen | F16L 55/48 |
| | | | 73/865.8 |
| 2007/0151475 A1 | 7/2007 | Nicholson | |
| 2008/0245258 A1 | 10/2008 | Herron et al. | |
| 2009/0307891 A1 | 12/2009 | Offer et al. | |
| 2014/0165870 A1 | 6/2014 | Bichler | |
| 2014/0216587 A1 | 8/2014 | Khalifa et al. | |
| 2015/0114507 A1 | 4/2015 | Warren | |
| 2021/0025536 A1 | 1/2021 | Duncan et al. | |

OTHER PUBLICATIONS

Moghaddam et al., "In-pipe inspection crawler adaptable to the pipe interior diameter", International Journal of Robotics and Automation, vol. No. 26, Issue No. 2, pp. 135-145, 2011.

Papincak et al., "Robotic Measurement of Holdup Deposit Volume in Gaseous Diffusion Piping to Quantify U-235 Content—18375", WM2018 Conference, Mar. 18-27, 2018, Phoenix, Arizona, USA, Mar. 18-27, 2018.

* cited by examiner

SYSTEMS AND METHODS FOR MAINTAINING PIPES

CROSS-REFERENCE TO RELATED APPLICATIONS

This application claims priority to U.S. Provisional Patent Application Ser. No. 62/877,386, filed on Jul. 23, 2019, the disclosure of which is hereby incorporated by reference in its entirety.

BACKGROUND

The field of the disclosure relates to maintenance of pipes, and more particularly to systems including motorized apparatus configured to travel through an interior cavity of the pipes and perform a maintenance operation within the pipes.

Pipes are commonly used to transport fluids. For example, typical pipes include a cylindrical sidewall that defines an interior cavity. During operation, fluids are transported within the interior cavity of the pipes. Sometimes, the fluids that are transported through the pipes have characteristics that can cause wear, deterioration, or otherwise affect the properties of the pipes. As a result, the pipes may require routine inspection and repair. However, the interior cavity of the pipes may be difficult to access for routine maintenance. For example, at least some known pipes are used to transport fluids having high temperatures, pressures, and/or other properties that create conditions which are inhospitable for at least some known maintenance apparatus. Moreover, at least some known pipes are difficult for at least some known apparatus to travel through because of the pipes' size, shape, and obstacles within the interior cavity. In addition, at least some known maintenance apparatus are unable to provide precise and reliable localization information for the maintenance apparatus within the interior cavity.

Accordingly, it is desirable to provide a system including a motorized apparatus configured to travel through an interior cavity of the pipes and perform a maintenance operation within the pipes.

BRIEF DESCRIPTION

In one aspect, a system for use in maintaining a pipe having a sidewall defining an interior cavity is provided. The system includes a motorized apparatus sized to fit within the interior cavity and configured to travel along the pipe through the interior cavity. The motorized apparatus includes a body assembly sized to fit within the interior cavity and configured to travel along the pipe through the interior cavity. The body assembly includes a first end and a second end, and extends along a longitudinal axis. The body assembly also includes a plurality of leg assemblies coupled circumferentially around the body assembly. Each leg assembly of the plurality of leg assemblies includes a leg member including a first end, a second end, and a telescoping portion extending between the first end and the second end. The body assembly also includes an actuator assembly coupled to each leg assembly of the plurality of leg assemblies. The actuator assembly is configured to independently actuate each leg assembly of the plurality of leg assemblies to adjust a position of each leg assembly of the plurality of leg assemblies. Each leg member of each leg assembly of the plurality of leg assemblies is coupled to the body assembly and is configured to move along the longitudinal axis of the body assembly when the actuator assembly actuates an associated leg assembly. The body assembly also includes at least one sensor configured to collect information associated with the position of each leg assembly of the plurality of leg assemblies. The body assembly also includes a controller communicatively coupled to the motorized apparatus and configured to receive the information from the sensor. The controller is further configured to determine at least one of a pipe diameter and a pitch of the motorized apparatus based on the information from the at least one sensor.

In another aspect, a motorized apparatus for use in maintaining a pipe having a sidewall defining an interior cavity is provided. The motorized apparatus includes a body assembly sized to fit within the interior cavity and configured to travel along the pipe through the interior cavity. The body assembly includes a first end and a second end, and extends along a longitudinal axis. The body assembly also includes a plurality of leg assemblies coupled circumferentially around the body assembly. Each leg assembly of the plurality of leg assemblies includes a first leg member including a first end, a second end, and a telescoping portion extending between the first end and the second end. The second end of the first leg member is coupled to the body assembly and is configured to move along the longitudinal axis of the body assembly. Each leg assembly of the plurality of leg assemblies also includes a second leg member coupled to the body assembly and the first leg member. Each leg assembly of the plurality of leg assemblies also includes a drive mechanism coupled to at least one of the first leg member and the second leg member and configured to interact with the sidewall as the body assembly travels along the pipe. The body assembly also includes an actuator assembly coupled to each leg assembly of the plurality of leg assemblies and configured to independently actuate each leg assembly of the plurality of leg assemblies. The body assembly also includes at least one sensor configured to collect information associated with a position of the second end of each leg assembly of the plurality of leg assemblies and provide the information to a controller for determining at least one of a pipe diameter and a pitch of the body assembly.

In yet another aspect, a method for maintaining a pipe having a sidewall defining an interior cavity is provided. The method includes positioning a motorized apparatus within the interior cavity. The motorized apparatus includes a body assembly sized to fit within the interior cavity and configured to travel along the pipe through the interior cavity. The body assembly includes a plurality of leg assemblies coupled circumferentially around the body assembly. The method also includes positioning, using an actuator assembly, each leg assembly of the plurality of leg assemblies relative to the body assembly. Each leg assembly of the plurality of leg assemblies includes a telescoping portion. The method also includes collecting information associated with a position of the leg assemblies from at least one sensor coupled to the body assembly. The method also includes mapping an orientation of the motorized apparatus based on the information from the at least one sensor.

DRAWINGS

These and other features, aspects, and advantages of the present disclosure will become better understood when the following detailed description is read with reference to the accompanying drawings in which like characters represent like parts throughout the drawings, wherein.

Figure 1:
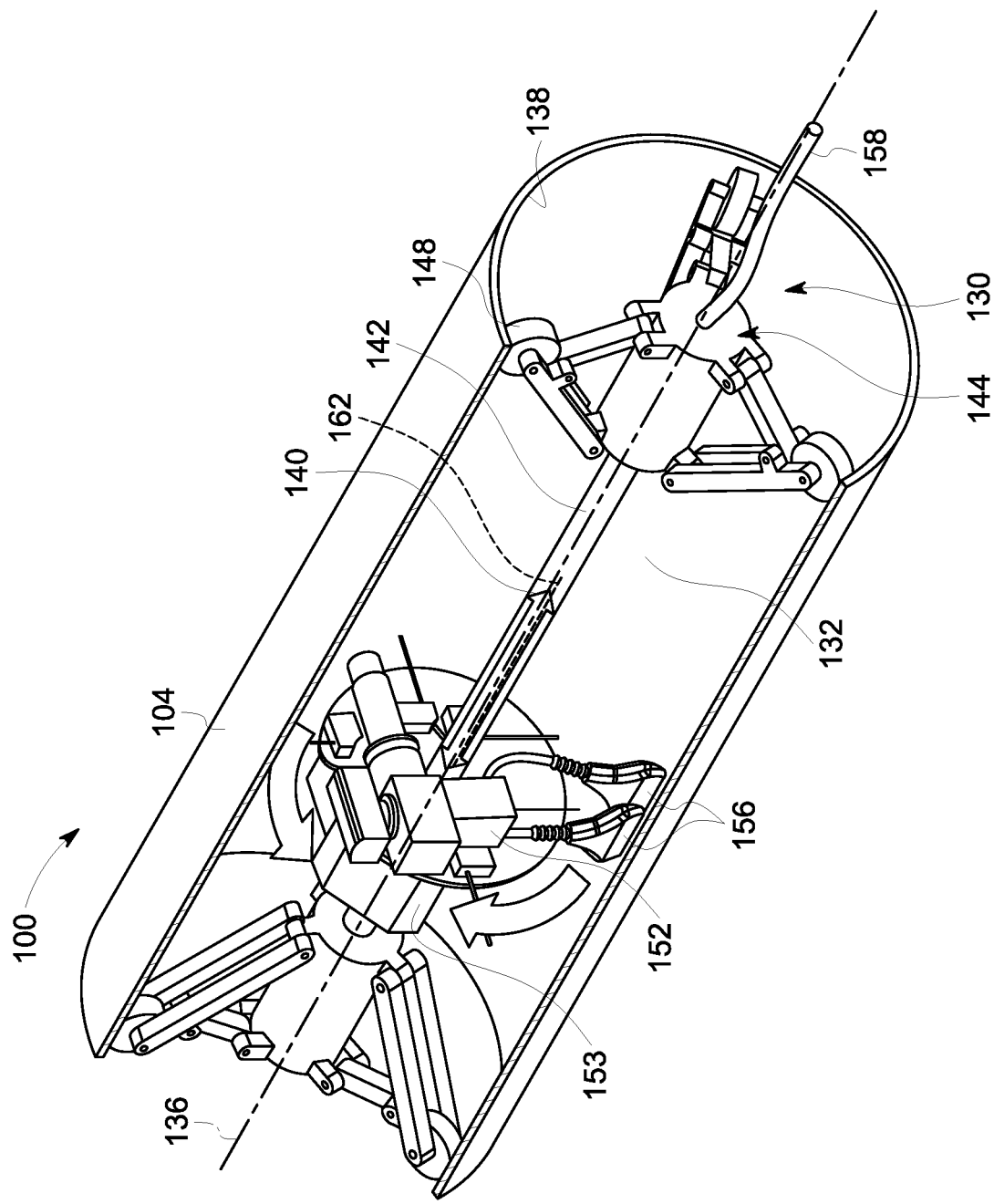
FIG. 1 is a schematic view of a portion of a pipe with a motorized apparatus traveling through an interior cavity of the pipe.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the exemplary embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein relate to a system for inspecting and/or repairing pipes. The system includes multi-legged independently actuated motorized apparatus for delivering inspection and repair tools to difficult to access locations within piping networks. Mechanical separation and independent control of each leg enables an operator to control a radial position and axial pitch of the motorized apparatus within a pipe. The motorized apparatus is able to traverse non-concentric transitions and size changes of the piping systems, and to navigate curves within the piping systems. The independently actuated, antagonistically positioned legs maintain contact with a pipe wall allowing the motorized apparatus to tilt and shift relative to an axis of the pipe. As a result, the apparatus is able to traverse obstacles including curves, reducers (concentric and eccentric), and vertical segments.

In some embodiments, the system utilizes antagonistically positioned legs to actively measure forces on contact surfaces within piping networks and to verify contact with the contact surfaces. Moreover, the system is able to determine variations in pressure provided by the limbs and adjust the position of the limbs to provide a substantially equal pressure profile. By combining a mechanical suspension system with sensors that both actively measure and passively adjust to changes in pressure, the system is able to adjust to changes in pipe sizes and to the presence of debris. As a result, the system ensures that a sufficient pressure profile is provided to allow the motorized apparatus to remain stable within the pipe, while preventing slippage, positional drift, and unrecoverable falling.

Also, in some embodiments, the motorized apparatus has a modular construction and includes universal couplings that enable interchangeability of portions of the motorized apparatus. The modularity of the motorized apparatus enables the incorporation of multiple different tool options specialized to several different repair or maintenance operations and allows simple adjustment of the functionality of the motorized apparatus. Moreover, the interchangeable portions of the motorized apparatus are quickly and simply removed to allow for repair and/or replacement. Moreover, the modular portions of the motorized apparatus can be inserted into a pipe in series instead of one larger structure requiring more space and clearance for insertion.

In addition, in some embodiments, the motorized apparatus uses information from sensors and the position of the legs to map an orientation of the motorized apparatus and determine parameters of the piping system such as the size of the pipe in which the system is operating. For example, by using data from the motorized apparatus' legs in contact with the pipe interior, an ellipse may be estimated and the nominal pipe diameter may be estimated as the minor diameter of the ellipse. In addition, the pitch of the motorized apparatus may be estimated from the axis of the pipe as a function of the major diameter of the ellipse. As a result, the motorized apparatus is able to provide information regarding the pipe as the motorized apparatus travels through the pipe. In addition, the motorized apparatus may use the determined information to map the interior of the pipe and allow for use of the map during a maintenance operation when visibility within the pipe may be limited.

Figure 2:
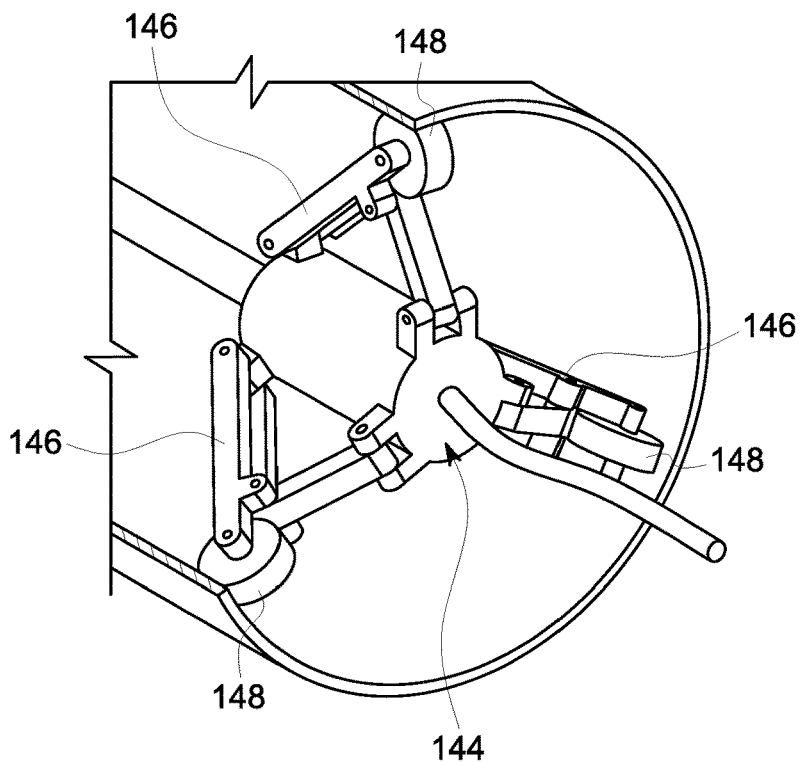
FIG. 2 is an enlarged view of a portion of the motorized apparatus shown in FIG. 1, the motorized apparatus located within the interior cavity of the pipe shown in FIG. 1.

FIG. 1 is a schematic view of a portion of a pipe 100 with a motorized apparatus 130 traveling through an interior cavity 132 of pipe 100. FIG. 2 is an enlarged view of a portion of motorized apparatus 130 located within interior cavity 132 of pipe 100. In the exemplary embodiment, pipe 100 includes a sidewall 104 having an interior surface 138 extending around a central axis 136 and defining interior cavity 132. Pipe 100 is cylindrical and has diameter in a range of about 6 inches to about 36 inches or about 12 inches to about 36 inches. In some embodiments, pipe 100 has a length of at least 500 feet. In alternative embodiments, pipe 100 may be any shape and/or size.

Also, in the exemplary embodiment, motorized apparatus 130 is configured to travel through interior cavity 132 of pipe 100 along a length of pipe 100. For example, in some embodiments, motorized apparatus 130 is configured to fit within interior cavity 132 and travel up to 500 feet along the length of pipe 100. Accordingly, motorized apparatus 130 facilitates inspection and repair of pipe 100 within interior cavity 132 at locations that are inaccessible from an exterior of pipe 100. Moreover, motorized apparatus 130 is self-propelled, meaning that motorized apparatus 130 moves within interior cavity 132 without an external force acting on motorized apparatus 130.

During operation, motorized apparatus 130 enters interior cavity 132 of pipe 100 from an opening or access hatch. Motorized apparatus 130 travels in a travel direction 140. In some embodiments, motorized apparatus 130 traverses transitions in pipe 100 such as bends or size transitions. When motorized apparatus 130 reaches a target location, motorized apparatus 130 goes into a parked mode and a maintenance device 152 of motorized apparatus 130 is positioned relative to motorized apparatus 130 to perform a maintenance and/or repair operation.

As motorized apparatus 130 travels through interior cavity 132, motorized apparatus 130 is used to inspect and/or repair any interior components of pipe 100. For example, in some embodiments, motorized apparatus 130 is used to generate an image of interior surface 138 and the image is examined to determine whether repairs are necessary. If repairs are necessary, motorized apparatus 130 can be used to repair interior surface 138. For example, in some embodiments, motorized apparatus 130 patches a damaged portion of interior surface 138. Interior surface 138 may be any surface within interior cavity 132 of pipe 100.

Motorized apparatus 130 includes a body assembly 142 sized to fit within interior cavity 132 and at least one drive system 144. Body assembly 142 of motorized apparatus 130 includes a longitudinal axis 162. Each drive system 144 is coupled to a leg assembly 146 and is configured to move body assembly 142 relative to pipe 100. For example, each drive system 144 includes a plurality of drive mechanisms such as wheels 148, and a motor (not shown) drivingly coupled to wheels 148. A power source, such as a battery, provides power for operation of the motor. In some embodiments, power is provided via tether 158. During operation, the motor induces rotation of wheels 148 relative to body assembly 142. Motorized apparatus 130 moves along surface 138 as wheels 148 rotate in contact with surface 138. In alternative embodiments, motorized apparatus 130 includes any drive system 144 that enables motorized apparatus 130 to operate as described. For example, in some embodiments, drive system 144 includes a drive mechanism other than wheels 148, such as treads, tracks, worms, legs, and/or electromagnetic or fluidic locomotion mechanisms.

Figure 3:
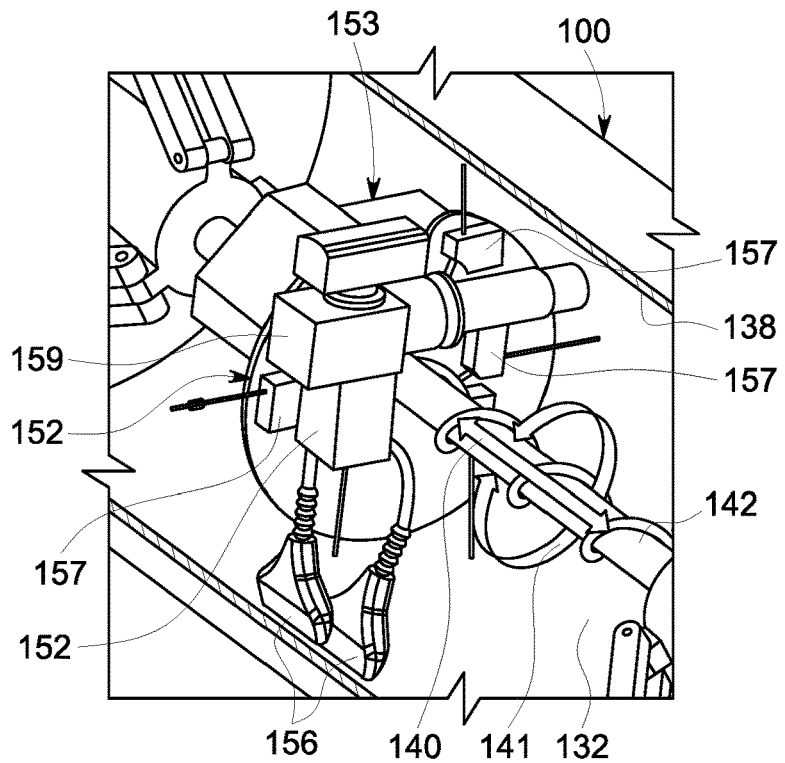
FIG. 3 is an enlarged schematic view of a portion of the motorized apparatus shown in FIG. 1, the motorized apparatus including a maintenance device.
Figure 4:
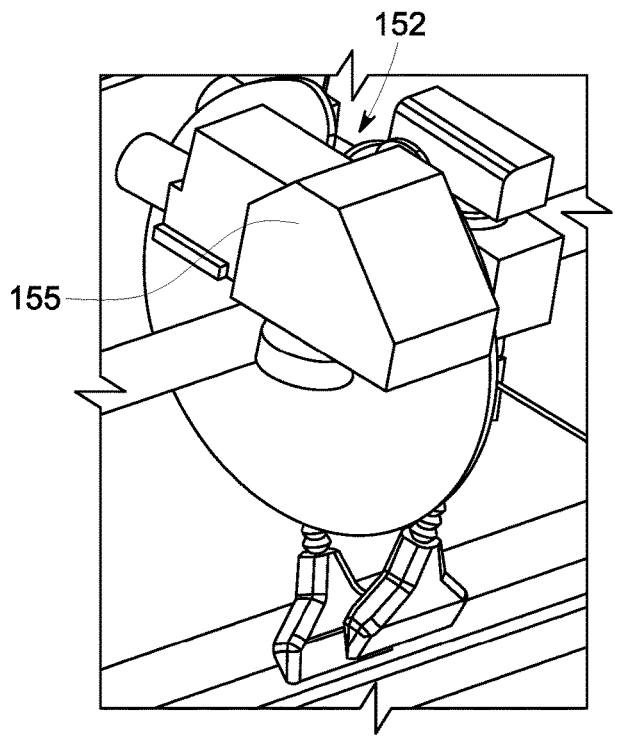
FIG. 4 is an enlarged perspective view of a portion of the maintenance device shown in FIG. 3.

FIG. 3 is an enlarged schematic view of a portion of motorized apparatus 130. FIG. 4 is an enlarged perspective view of a maintenance device 152 of motorized apparatus 130. In the exemplary embodiment, maintenance device 152 is coupled to body assembly 142. In some embodiments, maintenance device 152 is movable relative to body assembly 142. For example, maintenance device 152 can move translationally in travel direction 140 along body assembly 142 as well as rotate in rotation direction 141 about body assembly 142, offering the maintenance device 152 a field of regard covering interior cavity 132 of pipe 100. A maintenance device actuator 153 is coupled to body assembly 142 and maintenance device 152, and is operable to move maintenance device 152 translationally along body assembly 142 and to rotate 141 maintenance device 152 around body assembly 142.

In the exemplary embodiment, maintenance device 152 includes at least one sensor and at least one repair tool. For example, maintenance device 152 includes a laser ablation tool 155, a plurality of depth sensors 157, and a laser cladding head 159. In alternative embodiments, maintenance device 152 includes any device that enables maintenance device 152 to operate as described herein. For example, in some embodiments, maintenance device 152 includes, without limitation, any of the following: an applicator, a drill, a grinder, a heater, a welding electrode, a sprayer, an optical sensor (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray). In some embodiments, maintenance device 152 is used to provide information for steering motorized apparatus 130 and/or to perform a maintenance operation.

Moreover, in the exemplary embodiment, motorized apparatus 130 includes at least one nozzle 156. For example, nozzles 156 are coupled to body assembly 142 adjacent maintenance device 152. Nozzles 156 are configured to provide a forming gas for controlling the atmosphere at the worksite. In addition, nozzles 156 are configured to continually remove debris before, during, and/or after a maintenance operation is performed. Moreover, in some embodiments, nozzles 156 are configured to direct debris through interior cavity 132 as motorized apparatus 130 travels through interior cavity 132. In the exemplary embodiment, nozzles 156 are oriented to face at least partly radially outward from body assembly 142 and toward surface 138. In alternative embodiments, motorized apparatus 130 includes any nozzle 156 that enables motorized apparatus 130 to operate as described herein.

In addition, in some embodiments, motorized apparatus 130 includes a light source (not shown) configured to illuminate at least a portion of interior cavity 132 to facilitate steering of motorized apparatus 130 and/or to allow maintenance device 152 to capture images. The light source may be coupled to body assembly 142 and, in some embodiments, may be positionable relative to body assembly 142. In alternative embodiments, motorized apparatus 130 includes any light source that enables motorized apparatus 130 to operate as described herein.

Figure 5:
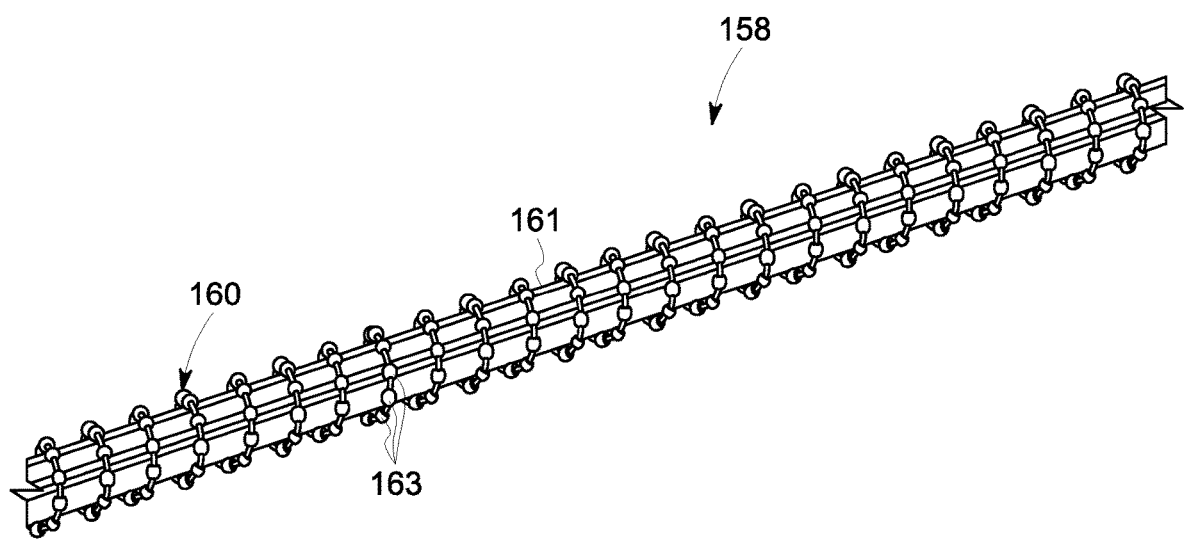
FIG. 5 is a perspective view of a tether for use with the motorized apparatus shown in FIG. 1.
Figure 6:
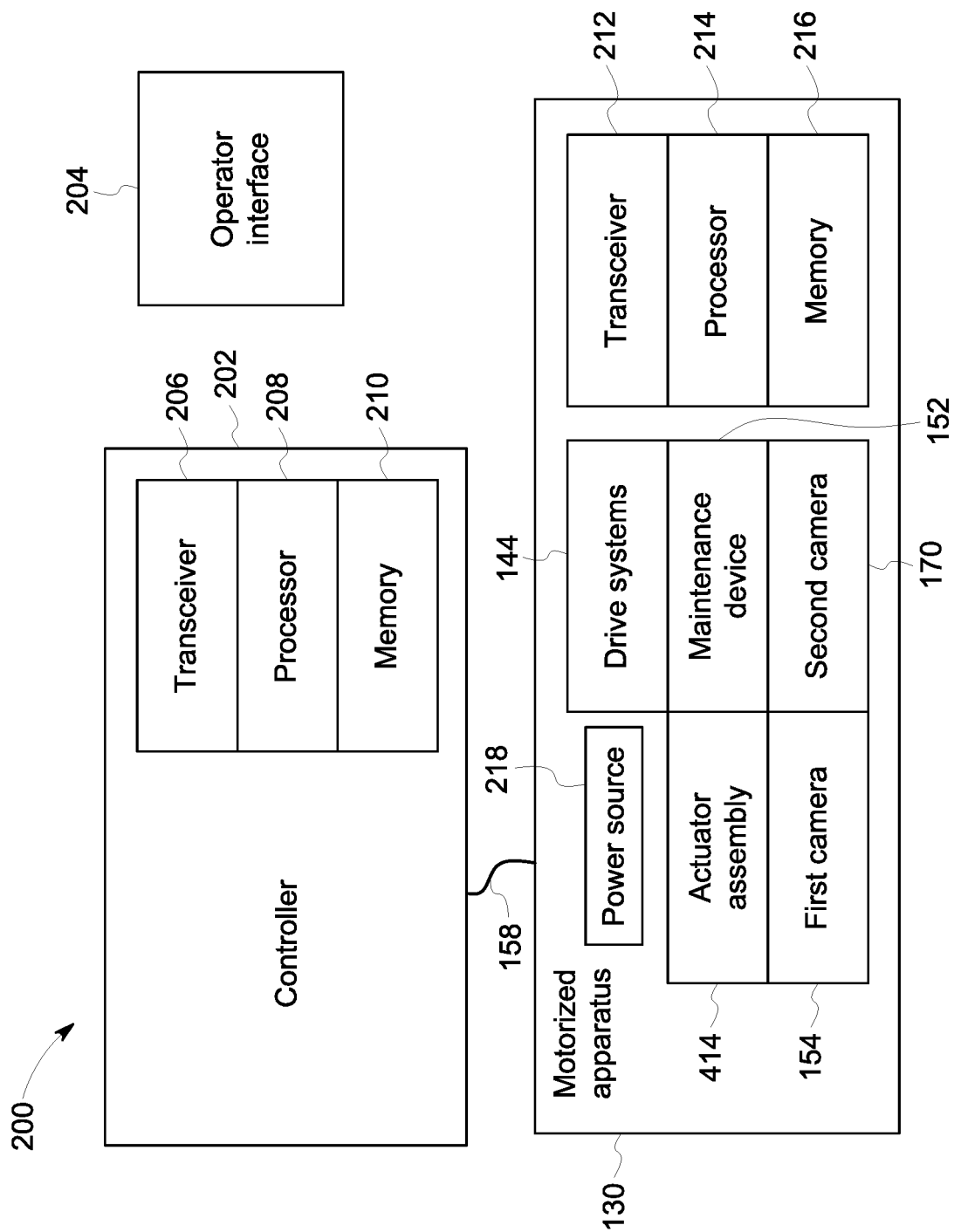
FIG. 6 is a block diagram of a system for use in maintaining the pipe shown in FIGS. 1 and 2.

FIG. 5 is a perspective view of a tether 158 for use with motorized apparatus 130. Tether 158 is coupled to motorized apparatus 130 and, as shown in FIG. 6, extends from motorized apparatus 130 to controller 202 as motorized apparatus 130 travels along the length of pipe 100. In some embodiments, tether 158 may be used to provide power and/or communications for motorized apparatus 130. In alternative embodiments, motorized apparatus 130 includes any tether 158 that enables motorized apparatus 130 to function as described herein. In some embodiments, tether 158 is omitted.

In addition, in the exemplary embodiment, tether 158 includes a casing 160 and a cable 161. Cable 161 includes means of transmitting electrical power or communication between controller 202 (shown in FIG. 6) and motorized apparatus 130 (shown in FIG. 6). For example, cable 161 may include electrically conductive material such as copper wiring. Cable 161 may also establish fluid communication between motorized apparatus 130 (shown in FIG. 6) and an external fluid source (not shown), such as a reservoir of cooling liquid or refrigerant. Casing 160 is configured to reduce contact between sidewall 104 (shown in FIG. 1) and cable 161 as motorized apparatus 130 travels through interior cavity 132. For example, in some embodiments, casing 160 includes a plurality of contact members 163 spaced around cable 161. Contact members 163 are connected to each other and may be wrapped around cable 161 in a helical shape. Contact members 163 are shaped to provide minimal contact with sidewall 104. For example, in some embodiments, contact members 163 are spheres. In addition, contact members 163 include a material providing less friction and less thermal conductivity than cable 161. In some embodiments, contact members 163 include a low friction and/or insulative coating. As a result, contact members 163 reduce the amount of friction between cable 161 and surface 138 and, therefore, the amount of force required to pull cable 161 as motorized apparatus 130 moves through pipe 100. In addition, casing 160 reduces heat transfer from pipe 100 to cable 161. In alternative embodiments, motorized apparatus 130 has any tether 158 that enables motorized apparatus 130 to operate as described herein.

FIG. 6 is a block diagram of a system 200 for use in maintaining pipe 100 (shown in FIG. 1). System 200 includes motorized apparatus 130, a controller 202, and an operator interface 204. Motorized apparatus 130 includes maintenance device 152, at least one camera 154, 170, and drive systems 144. In alternative embodiments, system 200 includes any component that enables system 200 to operate as described herein. For example, in some embodiments, cameras 154 are omitted. In further embodiments, operator interface 204 is omitted.

Also, in the exemplary embodiment, a first camera 154 is mounted to body assembly 142 and configured to provide information for driving motorized apparatus 130. For example, first camera 154 provides a live stream of the environment surrounding motorized apparatus 130. A second camera 170 is mounted to body assembly 142 adjacent maintenance device 152 and is configured to provide images of interior surface 138 (shown in FIG. 1) for use in performing a maintenance operation. First camera 154 and/or second camera 170 may be positionable relative to body assembly 142. In alternative embodiments, system 200 includes any camera 154, 170 that enables system 200 to operate as described herein.

In addition, in the exemplary embodiment, controller 202 includes a transceiver 206, a processor 208, and a memory 210. In some embodiments, controller 202 is positioned remotely from motorized apparatus 130, e.g., controller 202 is located at a base station that enables an operator on an exterior of pipe 100 (shown in FIG. 1) to interact with motorized apparatus 130. Transceiver 206 is communicatively coupled with motorized apparatus 130 and is configured to send information to and receive information from a transceiver 212 of motorized apparatus 130. In some embodiments, transceiver 206 and transceiver 212 communicate wirelessly. In alternative embodiments, motorized apparatus 130 and controller 202 communicate in any manner that enables system 200 to operate as described herein. For example, in some embodiments, controller 202 and motorized apparatus 130 exchange information through a wired link extending between motorized apparatus 130 and controller 202.

In some embodiments, controller 202 includes a mapping interface configured to generate a map of interior cavity 132 of pipe 100 (shown in FIG. 1) around motorized apparatus 130 based on information received from maintenance device 152.

In addition, in the exemplary embodiment, motorized apparatus 130 includes a processor 214 and a memory 216. Processor 214 is configured to execute instructions for controlling components of motorized apparatus 130, such as maintenance device 152 and drive systems 144. In alternative embodiments, motorized apparatus 130 includes any processor 214 that enables system 200 to operate as described herein. In some embodiments, processor 214 is omitted.

In some embodiments, maintenance device 152 includes one or more sensors and/or repair tools or pipe maintenance tools. For example, in the exemplary embodiment, maintenance device 152 includes a repair tool configured to repair interior surface 138 (shown in FIG. 1), or an inspection tool configured to inspect a portion of the interior cavity 132.

Also, in the exemplary embodiment, operator interface 204 is configured to display information relating to the characteristics detected by motorized apparatus 130 for interpretation by the operator. Operator interface 204 may be included on a remote computing device (not shown) and/or may be incorporated with controller 202. Operator interface 204 may include, among other possibilities, a web browser and/or a client application. For example, in some embodiments, operator interface 204 displays images of interior surface 138 based on received signals. In some embodiments, operator interface 204 allows an operator to input and/or view information relating to control of motorized apparatus 130. In the exemplary embodiment, operator interface 204 is configured to display information relating to the state of one or more of maintenance device 152 and a power source 218 for interpretation by the operator. For example, state information may include the position of motorized apparatus 130 along a length of pipe 100 (shown in FIG. 1). State information may also include a charge status of power source 218 and/or a current draw on the various drive and positioning motors. Processor 208 translates operator inputs into steering, tool motion, camera control, sensor control, sensor motion, and/or any other commands and sends information via transceiver 206 to motorized apparatus 130 via transceiver 212. In some embodiments, operator control of motorized apparatus 130 is in real time, such as through a joystick, keyboard, touchscreen, a remote motion capture system, and a wearable motion capture system or other interface having similar function. In other embodiments, motorized apparatus 130 is controlled partially or wholly according to a pre-programmed routine. In further embodiments, motorized apparatus 130 is at least partially automated. In some embodiments, an operator inputs information such as operation goals or conditional directions. In further embodiments, information, such as information received by controller 202 from motorized apparatus 130, control data sent to motorized apparatus 130, and additional operator inputs or state information (e.g., location, time, orientation, datalink quality, battery levels, repair material levels, failure mode indicators), is logged into memory 216 and/or memory 210.

Moreover, in the exemplary embodiment, controller 202 is positioned on the exterior of pipe 100 (shown in FIG. 1) and communicates with motorized apparatus 130 positioned within interior cavity 132 (shown in FIG. 1) of pipe 100 (shown in FIG. 1). For example, controller 202 is configured to send information to motorized apparatus 130 relating to the propulsion and/or steering of motorized apparatus 130 while motorized apparatus 130 is moving within interior cavity 132 (shown in FIG. 1) of pipe 100 (shown in FIG. 1) through a wireless connection and/or tether 158. In alternative embodiments, controller 202 and motorized apparatus 130 are configured in any manner that enables system 200 to operate as described herein.

Figure 7:
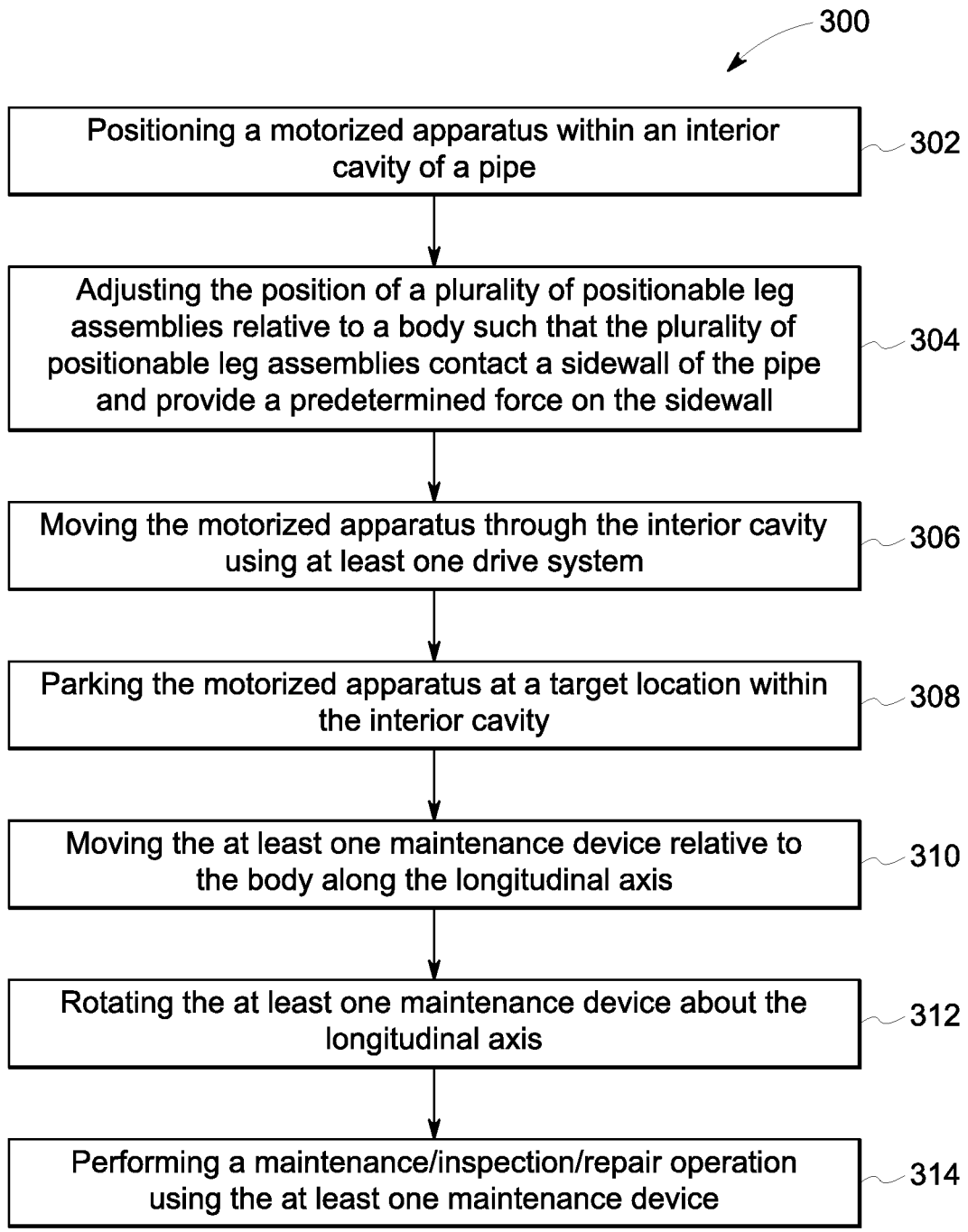
FIG. 7 is a flow chart of an exemplary method of performing a maintenance operation using the motorized apparatus shown in FIG. 1.

FIG. 7 is a flow chart of an exemplary method 300 of performing a maintenance operation for pipe 100 (shown in FIG. 1). In reference to FIGS. 1-7, method 300 includes positioning 302 motorized apparatus 130 within interior cavity 132 and adjusting 304 the position of leg assemblies 146 relative to body assembly 142 such that leg assemblies 146 contact sidewall 104 and provide a predetermined force on sidewall 104. In some embodiments, method 300 includes determining a diameter of pipe 100 based on the position of leg assemblies 146.

In addition, method 300 includes moving 306 motorized apparatus 130 through interior cavity 132 using at least one drive system 144 and parking 308 motorized apparatus 130 at a target location within interior cavity 132. For example, in some embodiments, motors of drive systems 144 are configured to rotate wheels 148 to drive motorized apparatus 130 through interior cavity 132. The rotation of wheels 148 is stopped at the target location and, in some embodiments, motorized apparatus 130 parks by positioning leg assemblies 146 such that an increased force is provided on interior surface 138 from leg assemblies 146.

In some embodiments, motorized apparatus 130 detects characteristics of pipe 100 around motorized apparatus 130 when motorized apparatus 130 is parked within interior cavity 132. For example, in some embodiments, a map is generated of interior surface 138 around motorized apparatus 130 when motorized apparatus 130 is parked at a location along pipe 100. After the map is generated, motorized apparatus 130 is able to perform a maintenance operation on interior surface 138 based on information from the map. Accordingly, motorized apparatus 130 is able to operate even if sensors are unable to provide information during a maintenance operation.

Also, method 300 includes moving 310, using maintenance device actuator 153, maintenance device 152 relative to body assembly 142 along the longitudinal axis 162 of body assembly 142 and rotating, using maintenance device actuator 153, 312 maintenance device 152 about the longitudinal axis 162.

Moreover, method 300 includes performing 314 at least one of a maintenance operation, an inspection operation, and a repair operation using maintenance device 152.

In some embodiments, method 300 includes transmitting signals between motorized apparatus 130 and controller 202 through tether 158 coupled to motorized apparatus 130. Tether 158 extends from motorized apparatus 130 to an exterior of pipe 100. Accordingly, tether 158 allows motorized apparatus 130 to send and receive signals from controller 202 on an exterior of pipe 100. For example, in some embodiments, motorized apparatus 130 receives power via tether 158. In further embodiments, signals are transmitted through tether 158 with instructions for driving and operating motorized apparatus 130. Accordingly, tether 158 allows motorized apparatus 130 to have a compact size because components exterior of motorized apparatus 130 can communicate and provide signals to tether 158.

In some embodiments, method 300 includes providing fluid flow to motorized apparatus 130. The fluid flow is used for cooling components of motorized apparatus, to facilitate a maintenance operation, and/or for removing debris after the maintenance operation. For example, in some embodiments, the fluid flow is directed through at least one housing of motorized apparatus 130. In further embodiments, fluid flow is directed into interior cavity 132 through nozzles 156.

Figure 8:
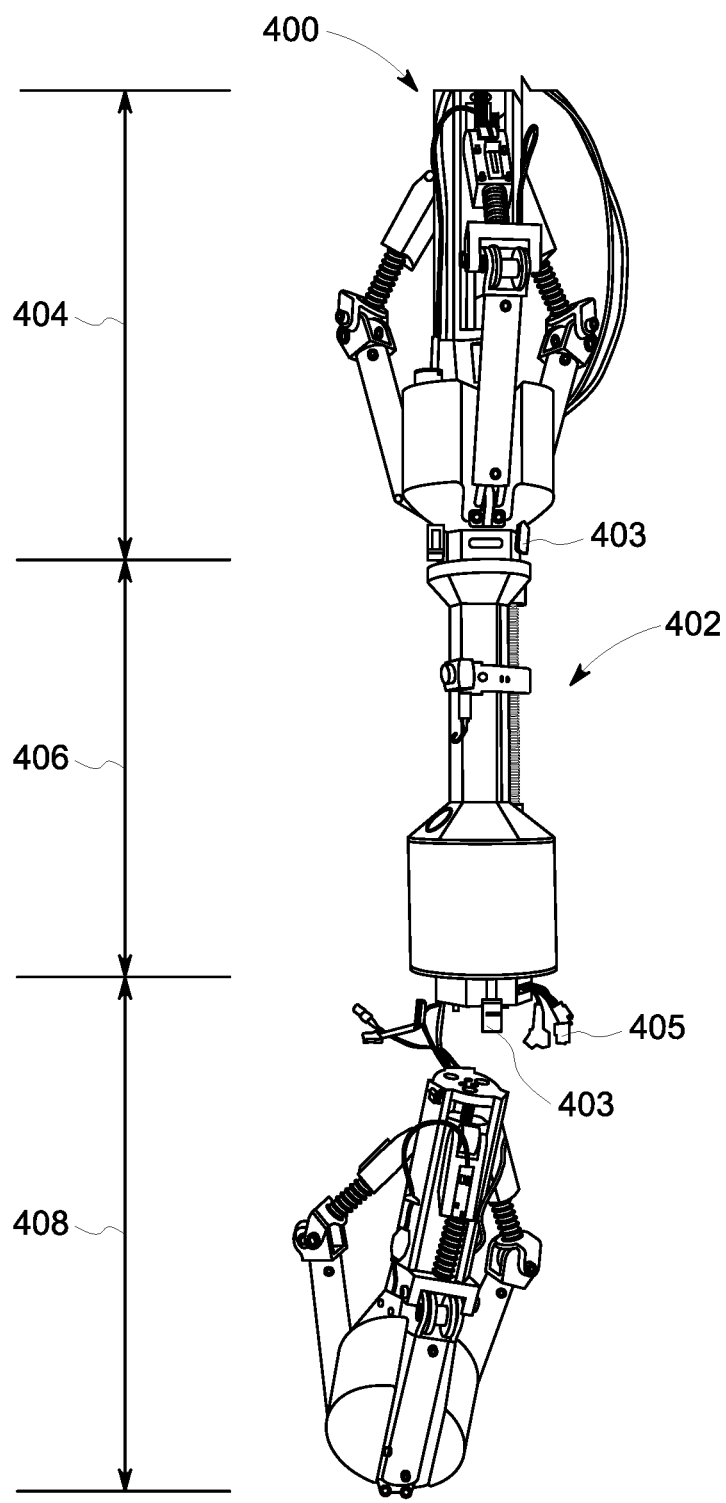
FIG. 8 is a perspective view of an exemplary embodiment of a motorized apparatus for use with the system shown in FIG. 6.
Figure 9:
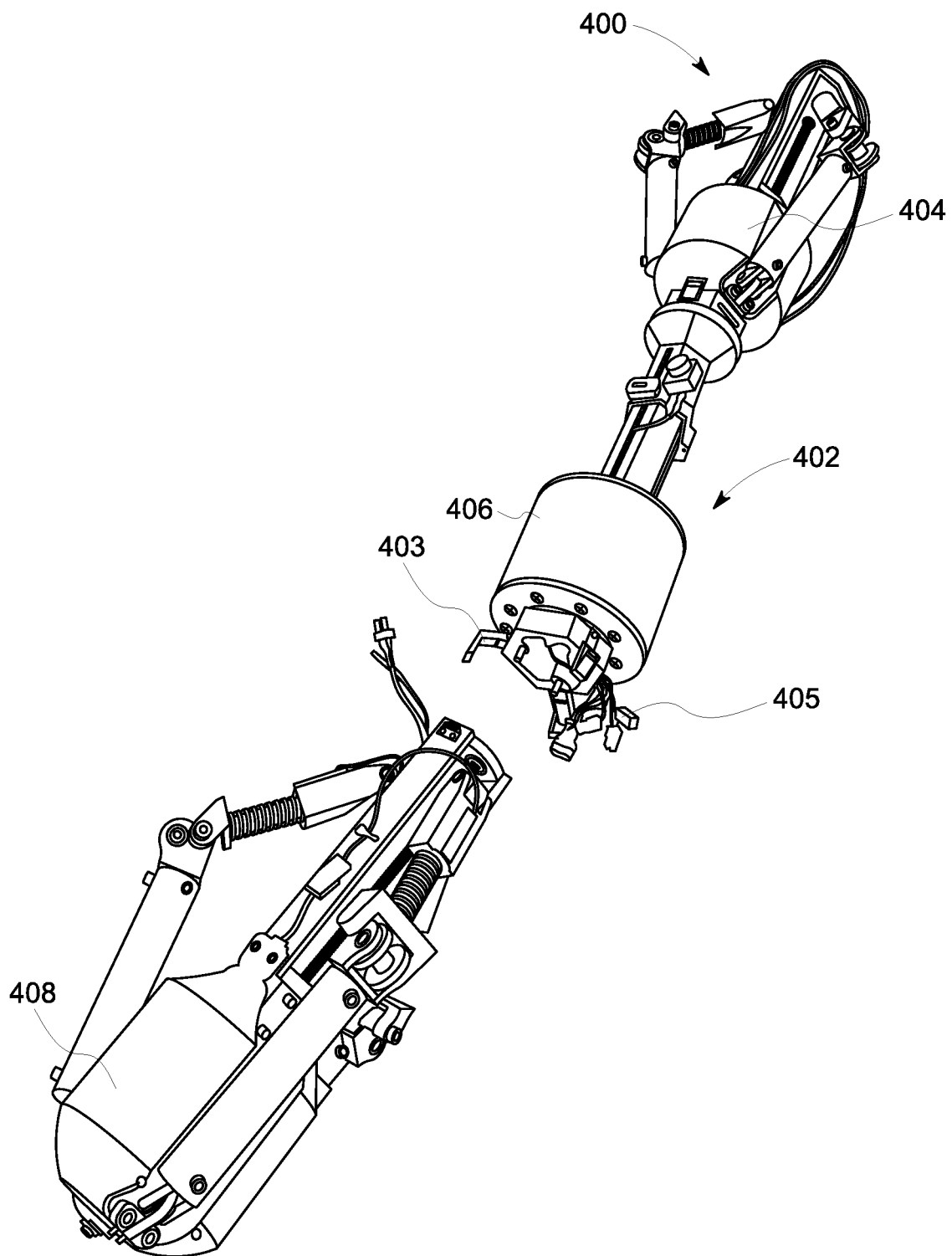
FIG. 9 is a perspective view of the motorized apparatus shown in FIG. 8 with a drive portion of the motorized apparatus detached from a maintenance device portion.

FIG. 8 is a perspective view of an exemplary embodiment of a motorized apparatus 400 for use with system 200 (shown in FIG. 6). FIG. 9 is a perspective view of motorized apparatus 400 with a drive portion 404 of motorized apparatus 400 detached from a maintenance device portion 406. Motorized apparatus 400 includes a body assembly 402 sized to fit within interior cavity 132 (shown in FIG. 2). Body assembly 402 is modular and includes a plurality of portions that are detachably coupled together. Specifically, body assembly 402 includes a first drive portion 404, a maintenance device portion 406, and a second drive portion 408. In alternative embodiments, body assembly 402 includes any portions that enable motorized apparatus 400 to operate as described herein.

In the exemplary embodiment, first drive portion 404 and second drive portion 408 are coupled to opposite ends of maintenance device portion 406. Portions 404, 406, 408 are coupled together in any suitable manner. For example, in some embodiments, portions 404, 406, 408 include clips 403 that are engaged when portions 404, 406, 408 are coupled together. In some embodiments, the connections between portions 404, 406, 408 include draw latches with locating pins. In alternative embodiments, motorized apparatus 400 includes any coupling device that enables motorized apparatus 400 to operate as described herein.

In addition, in the exemplary embodiment, each portion 404, 406, 408 of motorized apparatus 400 includes standardized electrical connections 405 that allow for coupling of electrical components on portions 404, 406, 408 together. For example, electrical connections 405 allow portions with different maintenance devices to be interchanged with each other without requiring swapping or adjusting the electrical connections.

As a result, motorized apparatus 400 is adaptable for different maintenance operations using various devices and/or portions. In addition, motorized apparatus 400 fits through smaller openings because motorized apparatus 400 includes portions 404, 406, 408. In some embodiments, portions 404, 406, 408 of motorized apparatus 400 are able to be individually positioned through the opening and then coupled together within interior cavity 132 (shown in FIG. 1). Moreover, motorized apparatus 400 allows for simpler removal and replacement of components of motorized apparatus 400.

Figure 10:
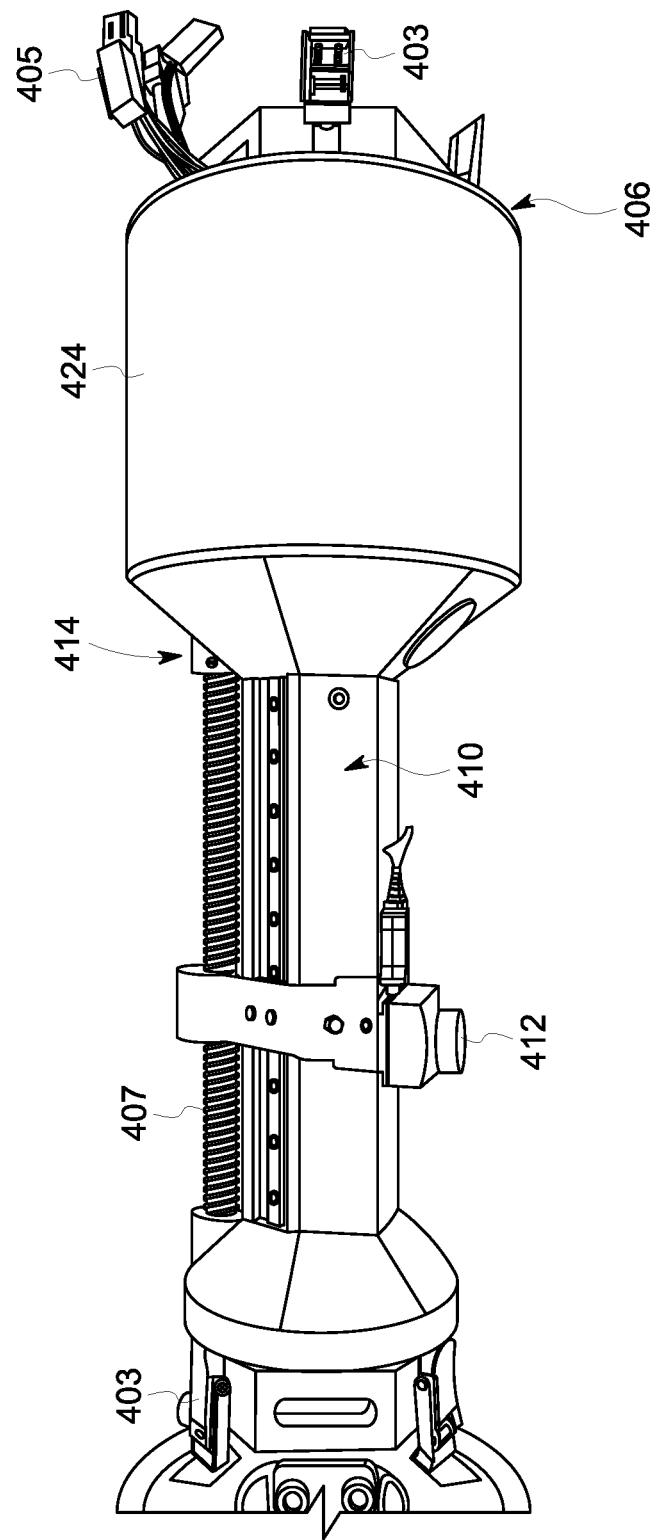
FIG. 10 is a perspective view of a maintenance device portion of the motorized apparatus shown in FIG. 8.
Figure 11:
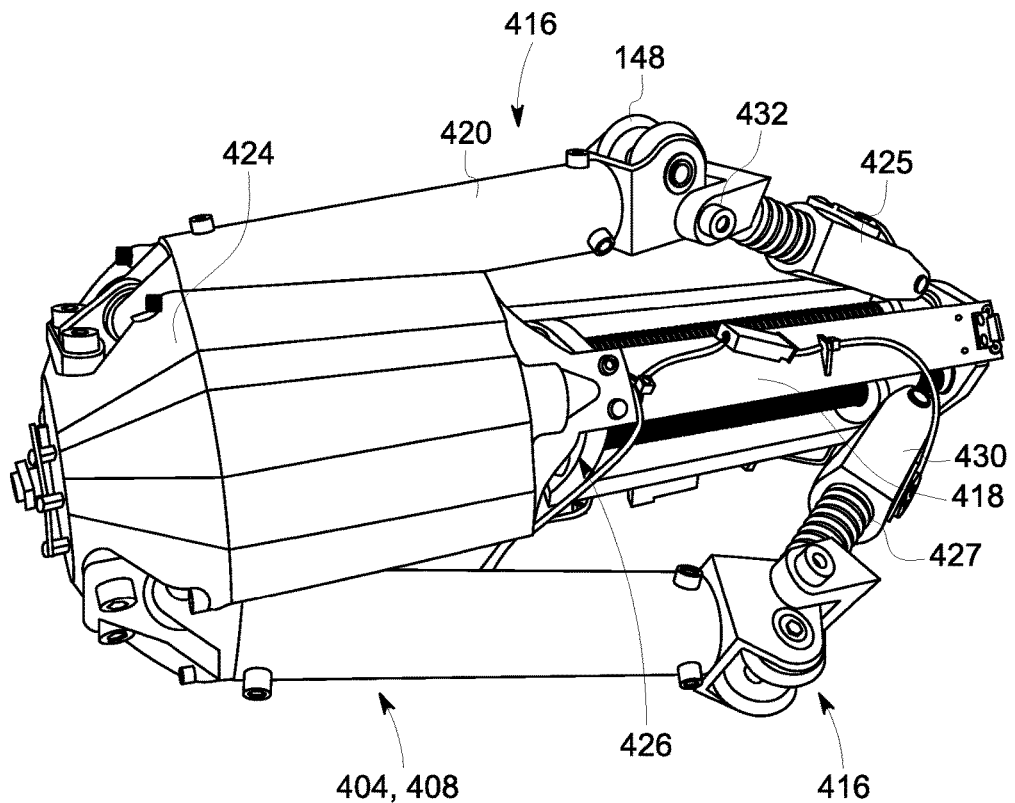
FIGS. 11-14 are perspective views of a drive portion of the motorized apparatus shown in FIG. 8.
Figure 12:
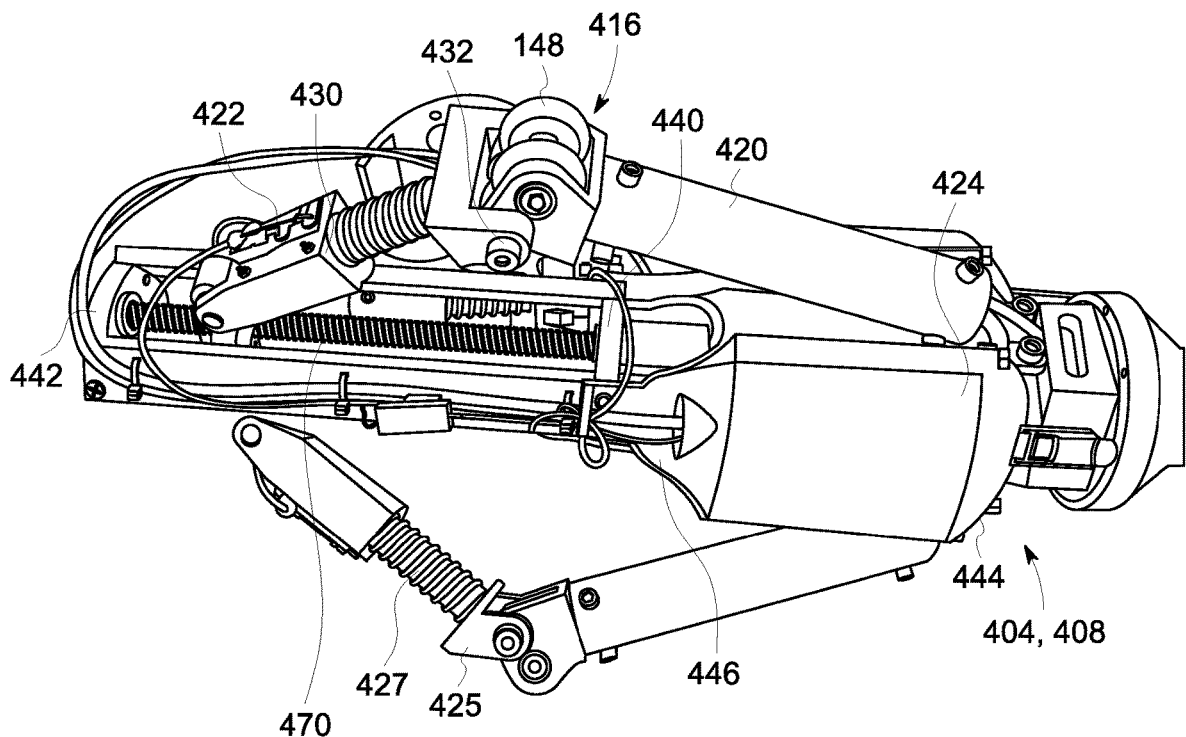
Figure 13:
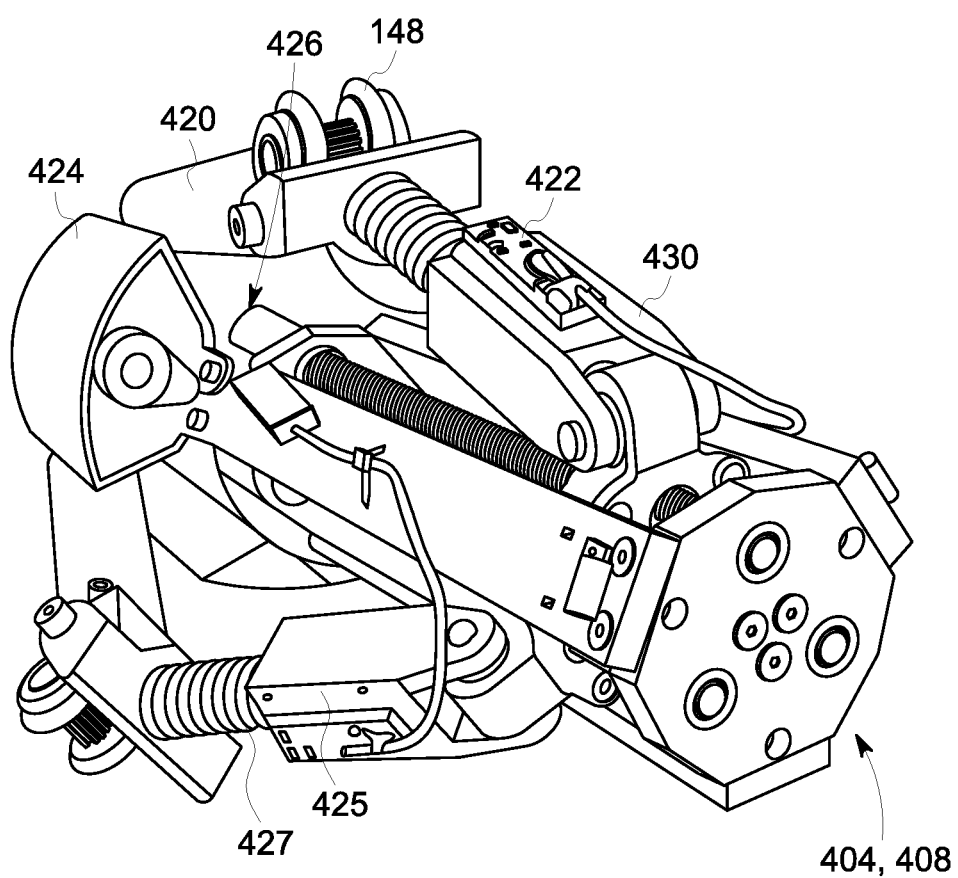
Figure 14:
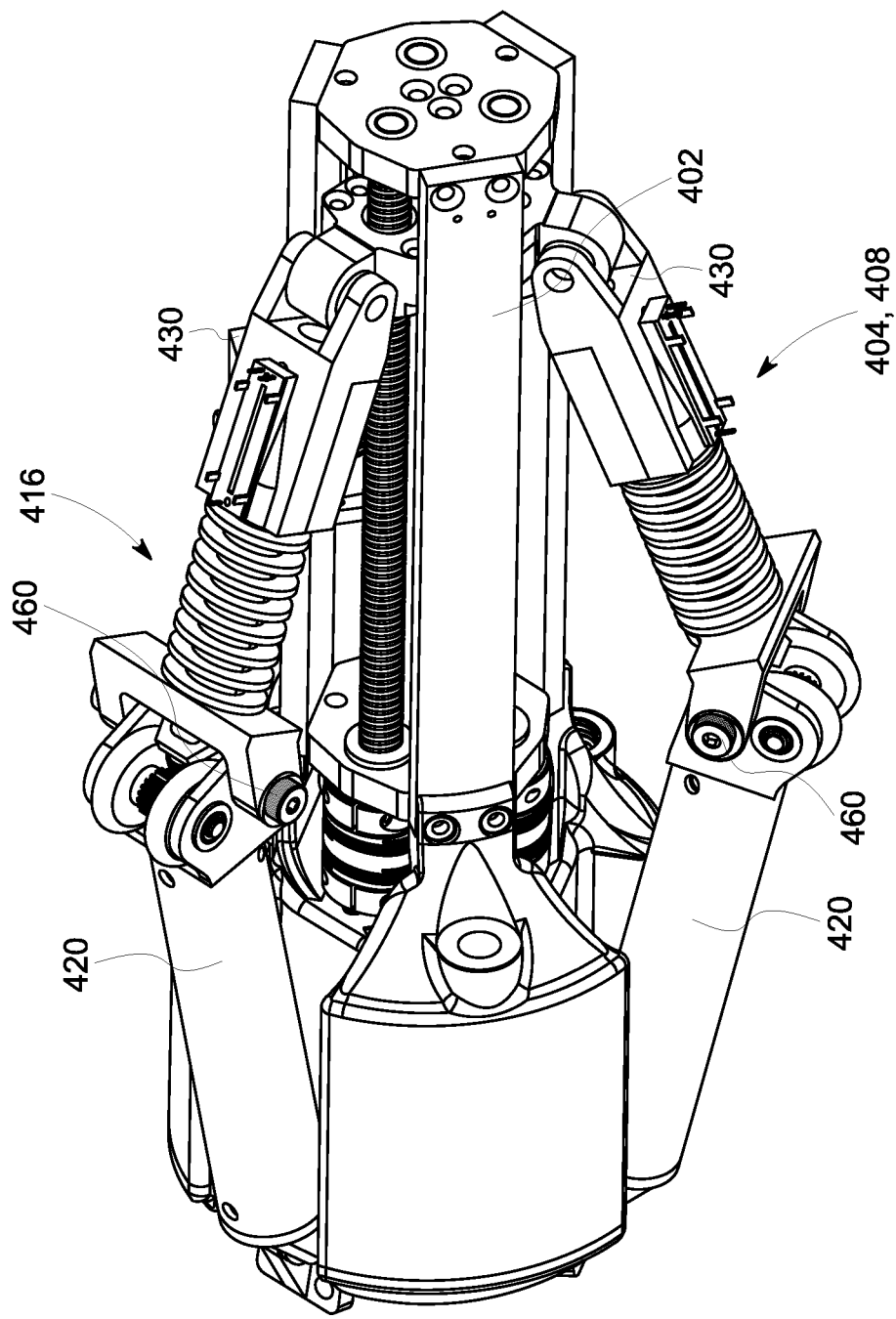

FIG. 10 is a perspective view of maintenance device portion 406 of motorized apparatus 400. Maintenance device portion 406 includes a maintenance body 410. Maintenance body 410 forms a portion of body assembly 402 when maintenance device portion 406 is coupled to at least one other portion 404, 406, 408. Maintenance body 410 includes an axial track 407. In addition, in the exemplary embodiment, at least one maintenance device 412 is coupled to maintenance body 410 and configured to move along maintenance body 410 of device portion 406. Specifically, maintenance device 412 moves along axial track 407 of maintenance body 410. Device portion 406 includes a maintenance actuator assembly 414 configured to position maintenance device 412 relative to maintenance body 410. In alternative embodiments, maintenance device portion 406 includes any maintenance body 410 that enables motorized apparatus 400 to operate as described herein.

In addition, in the exemplary embodiment, maintenance device portion 406 includes coupling mechanisms on opposite ends of maintenance body 410. Accordingly, maintenance device portion 406 is able to couple to other portions 404, 406, 408 on either end of maintenance device portion 406.

FIGS. 11-14 are perspective views of drive portions 404, 408 of motorized apparatus 400 (shown in FIG. 8). In the exemplary embodiment, drive portions 404, 408 are identical and are able to couple to either end of maintenance device portion 406 (shown in FIG. 10) and/or to each other. Accordingly, drive portions 404, 408 are interchangeable and are able to be removed and, if necessary, replaced.

Also, in the exemplary embodiment, each drive portion 404, 406 includes a support 418 including a support first end 440 and support second end 442, and a housing 424 including a housing first end 444 and a housing second end 446. Support first end 440 is coupled to housing second end 446.

Moreover, in the exemplary embodiment, each drive portion 404, 406 includes a plurality of leg assemblies 416. Leg assemblies 416 include a first leg portion 420 rotatably coupled to housing 424, and a second leg portion 430 moveably coupled to second end 442 of support 418. First leg portion 420 and second leg portion 430 are rotatably coupled together at joint 432. Leg assemblies 416 are positioned circumferentially around support 418.

In the exemplary embodiment, motorized apparatus 400 includes at least three leg assemblies 416 coupled to each drive portion 404, 408. Each leg assembly 416 is independently actuated and antagonistically positioned to maintain a constant contact force against the sidewall 104. Motorized apparatus 400 is able to tilt and shift relative to the axis of pipe 100 by controlling the position of leg assemblies 416. In alternative embodiments, motorized apparatus 400 includes any leg assemblies 416 that enable motorized apparatus 400 to operate as described herein.

In addition, in the exemplary embodiment, each drive portion 404, 406 includes at least on actuator assembly 426 configured to independently position second leg portions 430 of leg assemblies 416 relative to support 418. In the exemplary embodiment, each leg assembly 416 is positioned relative to support 418 by rotating a screw drive 470 engaged with the respective second leg portion 430. In the exemplary embodiment, actuator assembly 426 is housed in housing 424. In alternative embodiments, drive portion 404, 406 includes any actuator assembly 426 that enables motorized apparatus 400 to operate as described herein.

Moreover, in the exemplary embodiment, second leg portion 430 includes a telescoping portion 425 and a bias member 427. In the exemplary embodiment, bias member 427 is a spring. In other embodiments, bias member 427 may be another device able to store potential energy. Devices able to store potential energy may incorporate a piston, a plunger, or one or more magnets. Telescoping portion 425 is rotatably coupled to first leg portion 420 of leg assembly 416 at joint 432. In the exemplary embodiment, an elongate portion of telescoping portion 425 is housed within bias member 427 and an outer portion of telescoping portion 425 is positioned adjacent bias member 427 and slidably receives the elongate portion within an interior cavity. Bias member 427 exerts a force against telescoping portion 425 in a direction substantially away from second end 442 of support 418. The force of bias member 427 against telescoping portion 425 biases leg assemblies 416 in a radially outward position. In alternative embodiments, second leg portion 430 is configured to move in any manner that enables leg assemblies 416 to function as described herein.

Also, in the exemplary embodiment, motorized apparatus 400 is used to determine a size or a dimension of pipe 100 based on a position of leg assemblies 416. For example, in some embodiments, motorized apparatus 400 estimates an ellipse based on position data of leg assemblies 416, for example the length of first leg portions 420 relative to a center of motorized apparatus and the angle of first leg portions 420 relative to each other. A pipe diameter is estimated based on the minor diameter of the ellipse. Moreover, a pitch of motorized apparatus 400 relative to the central axis of pipe 100 is determined based on the major diameter of the ellipse. Suitably, leg assemblies 416 are controlled to adjust the pitch of motorized apparatus 400. Accordingly, by using a position of leg assemblies 416, motorized apparatus 400 is able to determine pipe size without relying on additional sensors such as time of flight sensors or wheel encoders. Moreover, in some embodiments, leg assemblies 416 are controlled with an at least partially automated controller that utilizes the pipe size information and leg assembly position information to maintain stability of motorized apparatus 400.

In addition, in the exemplary embodiment, motorized apparatus 130 includes at least one sensor. In the exemplary embodiment, the sensor is configured to collect data associated with a force between the sidewall and the drive mechanisms. For example, each leg assembly 416 includes a sensor assembly 422 configured to detect information relating to a displacement of bias member 427 and may be further configured to determine a force provided on sidewall 104 (shown in FIG. 1) by leg assemblies 416 based on the displacement of bias member 427. For example, sensor assembly 422 includes a linear position sensor that detects the position of telescoping portions 425 of second leg portions 430 relative to each other. Biasing member 427 is coupled to telescoping portions 425 and is configured to bias the telescoping portions 425 longitudinally along leg assembly 416. The bias force provided to leg assemblies 416 can be determined based on the detected position of the telescoping portions 425 and the properties of bias member 427. Leg assemblies 416 are controlled such that the bias member 427 is compressed when leg assemblies 416 contact sidewall 104. As a result, motorized apparatus 400 is able to verify that leg assemblies 416 each contact or interact with sidewall 104 and determine if leg assemblies 416 are providing equal pressure or predetermined pressure differentials on surface 138. The motorized apparatus 400 is further able to determine if leg assemblies 416 are providing a desired force or interaction on sidewall 104. In addition, motorized apparatus 400 provides closed loop controls of positioning of motorized apparatus 400 (e.g., self-centering or station keeping functions). Moreover, motorized apparatus 400 reduces positional drift, unrecoverable falling, and the required number of contact points of motorized apparatus 400. Also, motorized apparatus 400 is able to have a reduced size and detect potential slippage of drive mechanisms on sidewall 104 because motorized apparatus 400 is able to monitor the force of leg assemblies on sidewall 104.

Moreover, in the exemplary embodiment, each leg assembly 416 includes a joint 460 rotatably coupling first leg portion 420 to second leg portion 430. For example, joints 460 include pins and bearings that engage the ends of first leg portions 420 and second leg portions 430 opposite body assembly 402. Joints 460 define an outermost radius of motorized apparatus 400. Moreover, joints 460 are configured to move radially relative to the longitudinal axis of motorized apparatus 400 when leg assemblies 416 are actuated. In alternative embodiments, leg assemblies 416 include any joints that enable motorized apparatus 400 to operate as described herein.

Figure 15:
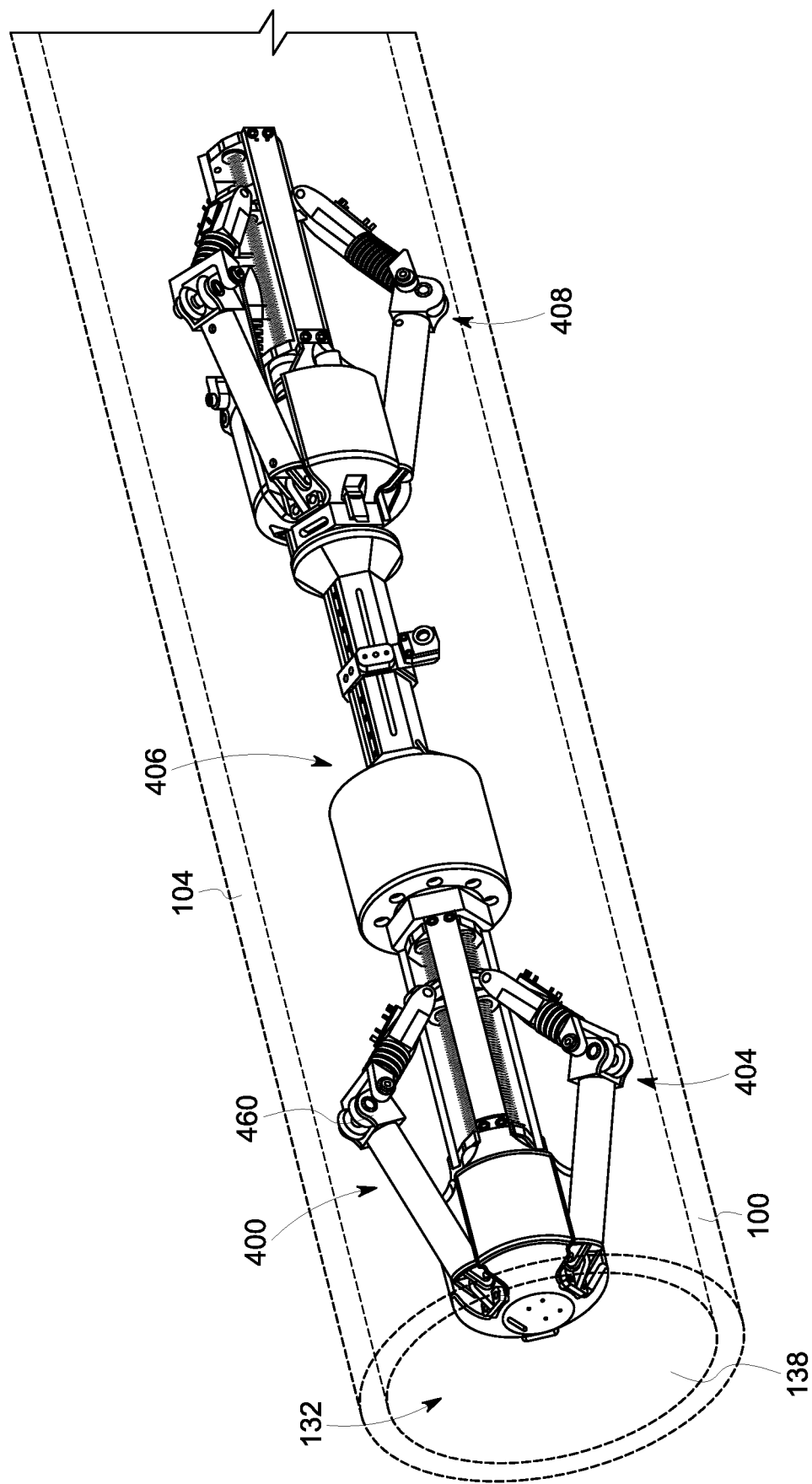
FIG. 15 is a perspective view of the motorized apparatus shown in FIG. 8 traveling through an interior cavity of a pipe.
Figure 16:
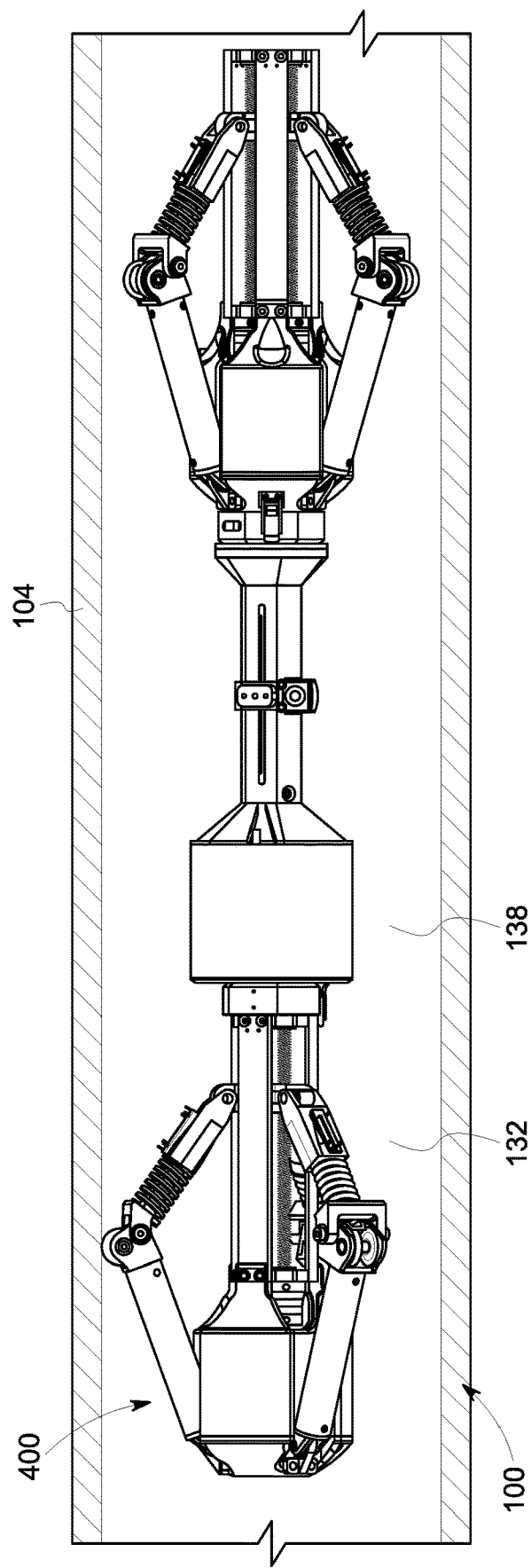
FIG. 16 is a side view of the motorized apparatus shown in FIG. 8 traveling through the interior cavity of the pipe shown in FIG. 15.
Figure 17:
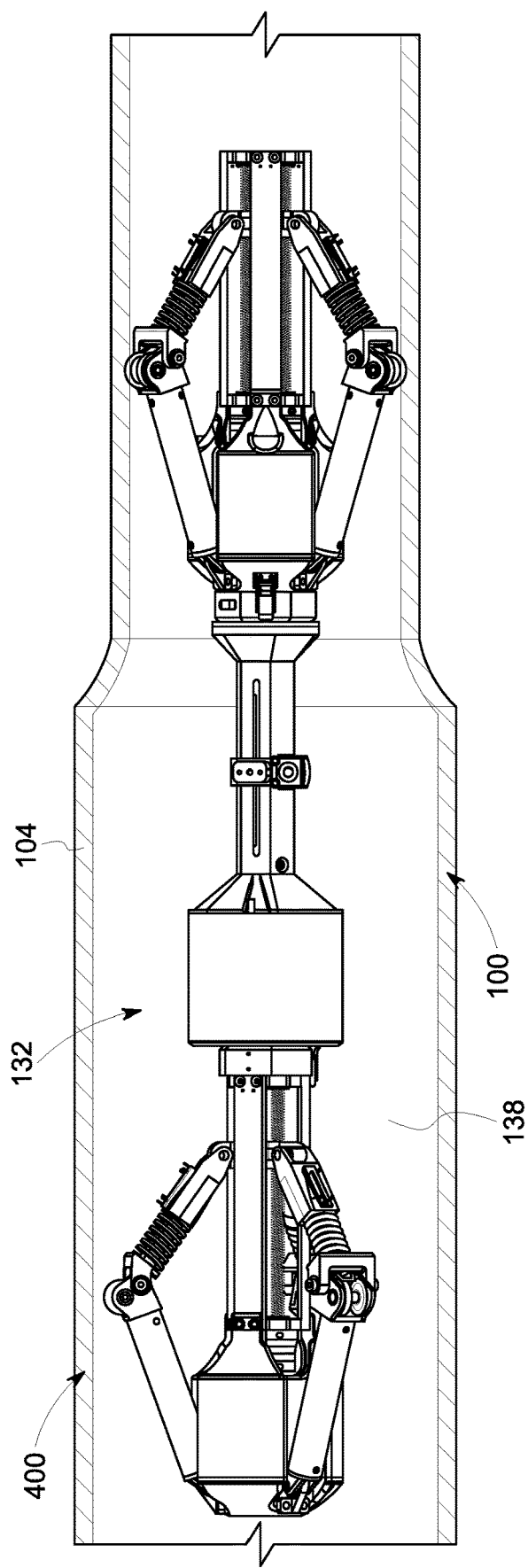
FIG. 17 is a side view of the motorized apparatus shown in FIG. 8 traversing a transition of the pipe shown in FIG. 15.

FIG. 15 is a perspective view of motorized apparatus 400 traveling through interior cavity 132 of pipe 100. FIG. 16 is a side view of motorized apparatus 400 traveling through interior cavity 132 of pipe 100. FIG. 17 is a side view of motorized apparatus 400 traversing a transition of pipe 100. Drive portions 404, 408 include drive systems configured to propel motorized apparatus 400 through interior cavity 132 of pipe 100. For example, drive mechanisms such as wheels interact with sidewall 104 and are driven by one or more motors to propel motorized apparatus 400 along pipe 100.

Also, in the exemplary embodiment, leg assemblies 416 are positionable relative to body assembly 402 and enable motorized apparatus 400 to traverse different transitions of pipe 100 (e.g., pipe size changes and bends). For example, leg assemblies 416 are positionable to support motorized apparatus 400 in a portion of pipe 100 having a reduced diameter by moving joints 460 of leg assemblies 416 closer to body assembly 402 using actuator assembly 426. In addition, leg assemblies 416 are able to adjust the radial position and/or orientation of body assembly 402 relative to a central axis of pipe 100. Moreover, motorized apparatus 400 is able to traverse non-concentric transitions because leg assemblies 416 are positionable and configured to traverse different transitions.

Figure 18:
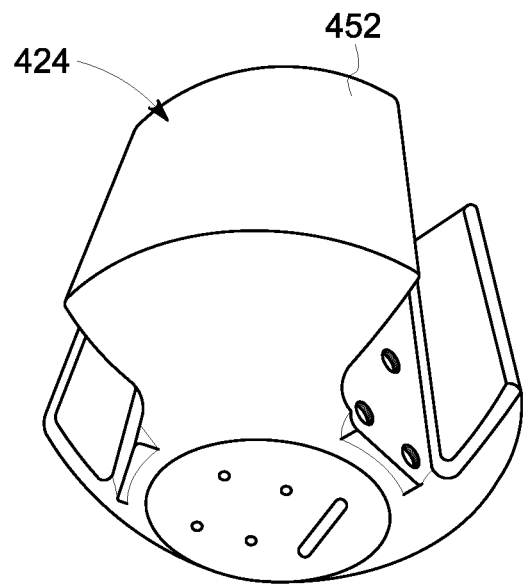
FIG. 18 is a perspective view of a housing of the motorized apparatus shown in FIG. 8.
Figure 19:
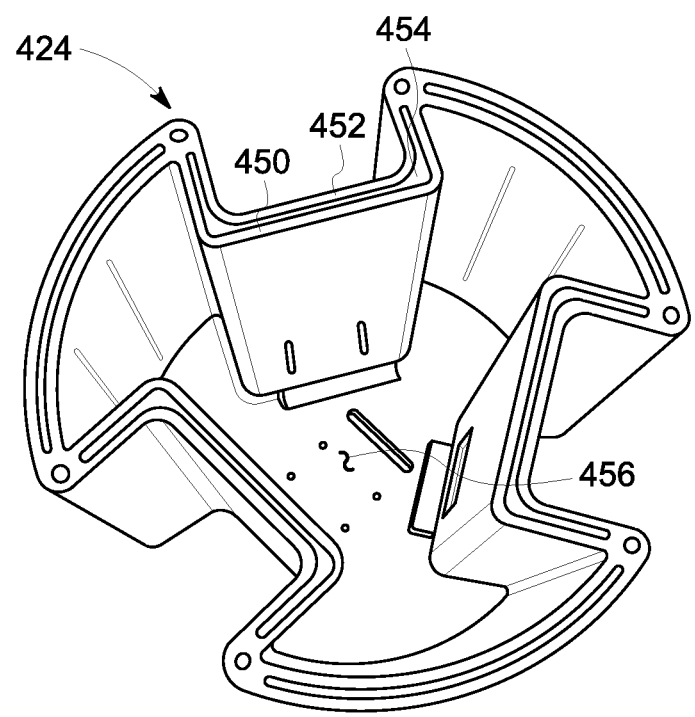
FIG. 19 is an end view of the housing shown in FIG. 18.

FIG. 18 is a perspective view of housing 424 of motorized apparatus 400. FIG. 19 is an end view of an interior of housing 424. Housing 424 is configured to protect one or more electronic components, such as electronics and drive systems, from environmental conditions inside pipe 100. In some embodiments, housing 424 is hermetically sealed. In addition, housing 424 is shaped and sized to house components within an interior space 456 such as actuator assembly 426 and to receive components such as leg assemblies 416 on an exterior of housing 424 without interfering with movement of leg assemblies 416. For example, housing 424 houses In alternative embodiments, motorized apparatus 400 includes any housing 424 that enables motorized apparatus 400 to operate as described herein.

In addition, in the exemplary embodiment, housing 424 includes at least one cooling channel 454 configured to transport fluid through portions of motorized apparatus 400 (shown in FIG. 8). For example, in some embodiments, housing 424 includes an inner wall 450 and an outer wall 452 defining a channel 454 therebetween configured to direct cooling fluid around an interior space 456 defined by housing 424. Accordingly, cooling fluid is able to receive heat from interior space 456 to regulate the temperature of interior space 456 and components within housing 424.

For example, in some embodiments, the fluid flow is provided through tether 158 and directed through channel 454 in housing 424 to cool components within housing 424. In addition, in some embodiments, the fluid flow is exhausted out of motorized apparatus 400 (shown in FIG. 8) in a direction that facilitates debris removal. For example, in some embodiments, the fluid flow is directed in a travel direction of motorized apparatus 400 shown in FIG. 8) within cavity 132 (shown in FIG. 1) as motorized apparatus 400 returns to an opening such that debris is swept up by motorized apparatus 400 for removal at the opening.

Figure 20:
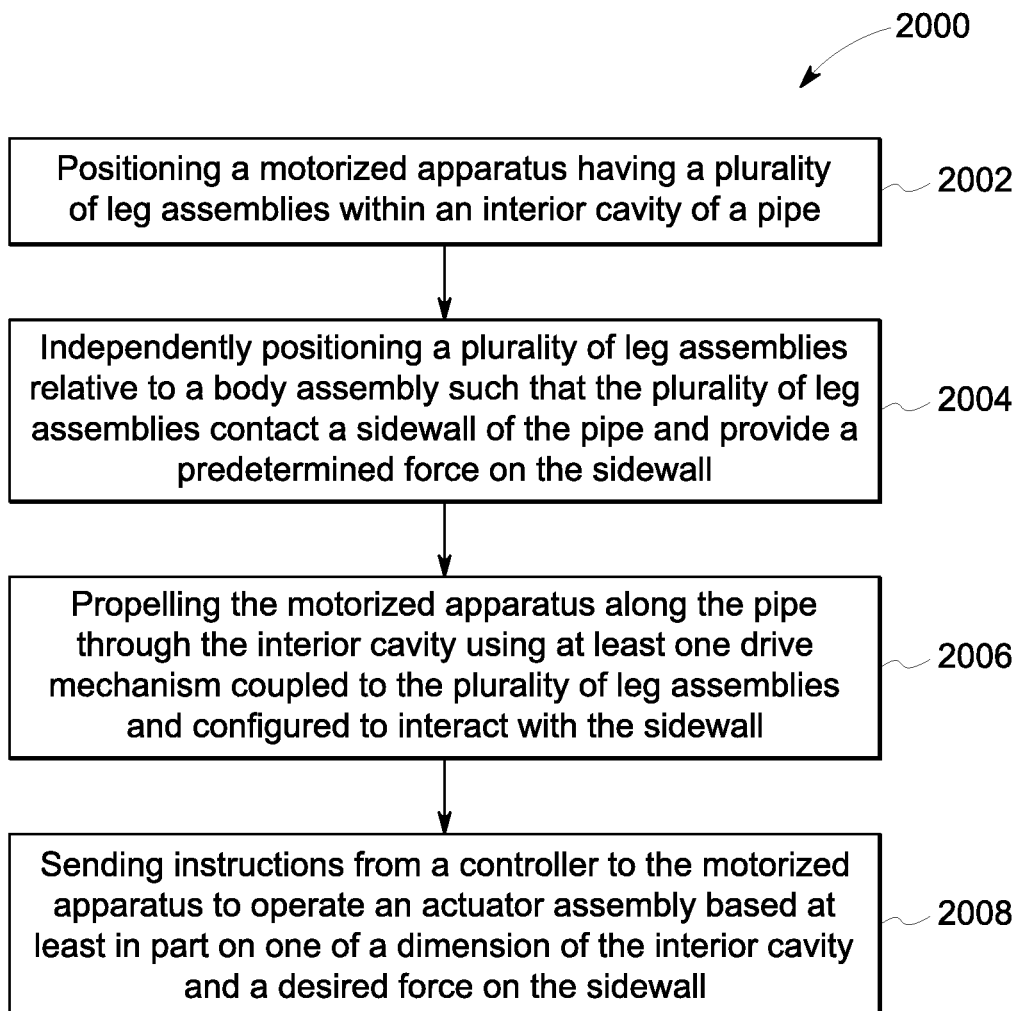
FIG. 20 is a flow chart of an exemplary method of driving the motorized apparatus shown in FIG. 1 through a pipe.

FIG. 20 is a flow chart of an exemplary method 2000 of driving motorized apparatus 400 through pipe 100 (shown in FIG. 15). In reference to FIGS. 6, 8, 12, 15, and 20, method 2000 includes positioning 2002 motorized apparatus 400 within interior cavity 132 of pipe 100, independently positioning 2004 leg assemblies 416 relative to body assembly 402 to adjust a radial position of joint 432 relative to body assembly 402 using actuator assembly 426 coupled to each leg assembly 416, propelling 2006 motorized apparatus 400 along pipe 100 through interior cavity 132 using a drive mechanism coupled to leg assemblies 416 and configured to interact with the sidewall 104, and sending 2008 instructions from controller 202 to motorized apparatus 400 to operate actuator assembly 426 based on, for example, a dimension of interior cavity 132 and/or a desired force on sidewall 104.

In some embodiments, method 2000 further includes moving a second leg portion 430 along the support 418 between support first end 440 and support second end 442 using actuator assembly 426.

Figure 21:
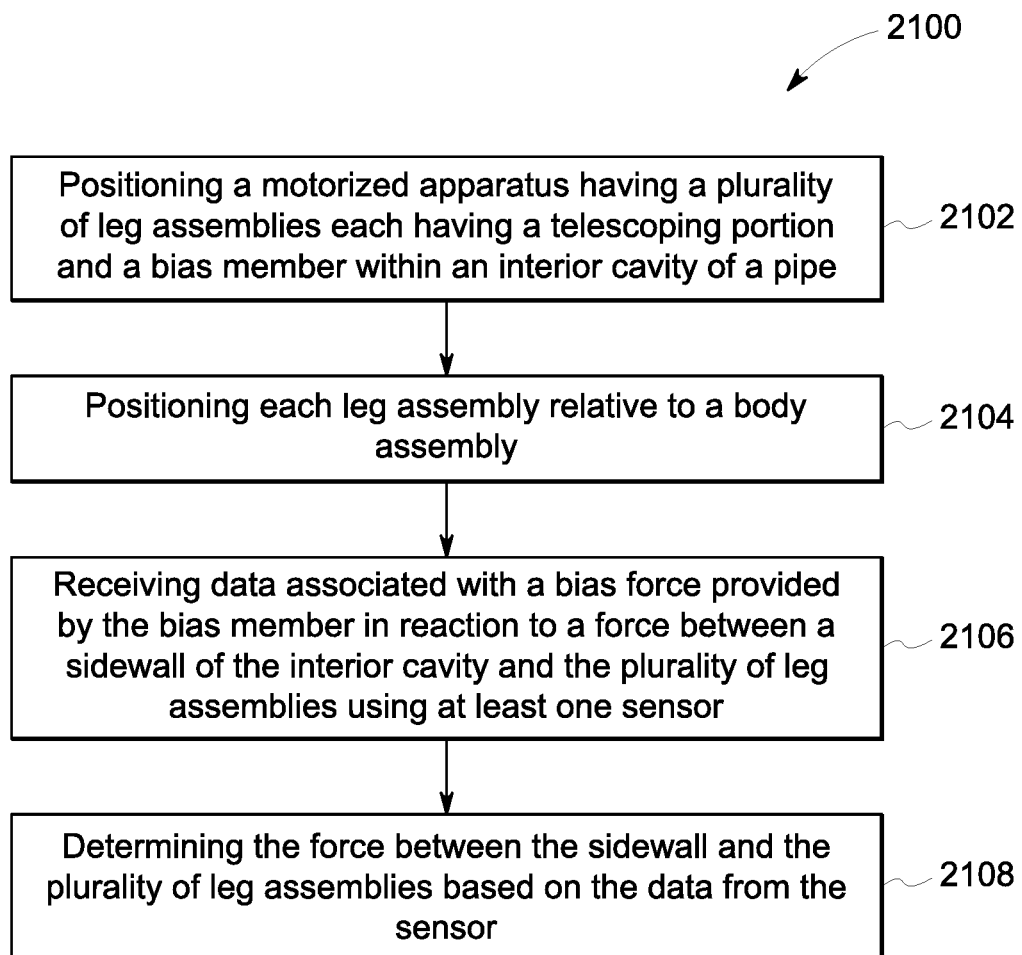
FIG. 21 is a flow chart of an exemplary method of measuring a force provided by the motorized apparatus shown in FIG. 1 on a pipe.

FIG. 21 is a flow chart of an exemplary method 2100 of measuring a force provided by motorized apparatus 400 on pipe 100 (shown in FIG. 1). In reference to FIGS. 8, 12, 15, and 21, method 2100 includes positioning 2102 motorized apparatus 400 within interior cavity 132 and positioning 2104 each leg assembly 416 relative to body assembly 402. Each leg assembly 416 includes telescoping portion 425 and bias member 427 coupled to telescoping portion 425. Bias member 427 is configured to bias telescoping portion 425 longitudinally along leg assembly 416. Method 2100 further includes receiving 2106 sensor data and associating it with a bias force provided by bias member 427 in reaction to a force between sidewall 104 and leg assemblies 416 using sensor assembly 422. A force between sidewall 104 and leg assemblies 416 may be determined 2108 based on the data from sensor assembly 422.

In some embodiments, method 2100 further includes comparing the determined force to a minimum threshold contact force to verify contact between leg assemblies 416 and sidewall 104.

Also, in some embodiments, sensor assembly 422 includes a plurality of sensors and each sensor is coupled to one of bias members 427. In some embodiments, method 2100 further includes receiving data from the plurality of sensors to generate a biasing member force profile and identify a difference between the biasing member force profile and a predetermined biasing member force profile. In further embodiments, method 2100 further includes generating an instruction set based on the identified difference between the biasing member force profile and the predetermined biasing member force profile. The instruction set may be communicated to actuator assembly 426 to cause actuator assembly 426 to independently actuate leg assemblies 416 such that the identified difference between the biasing member force profile and the predetermined biasing member force profile is reduced.

Figure 22:
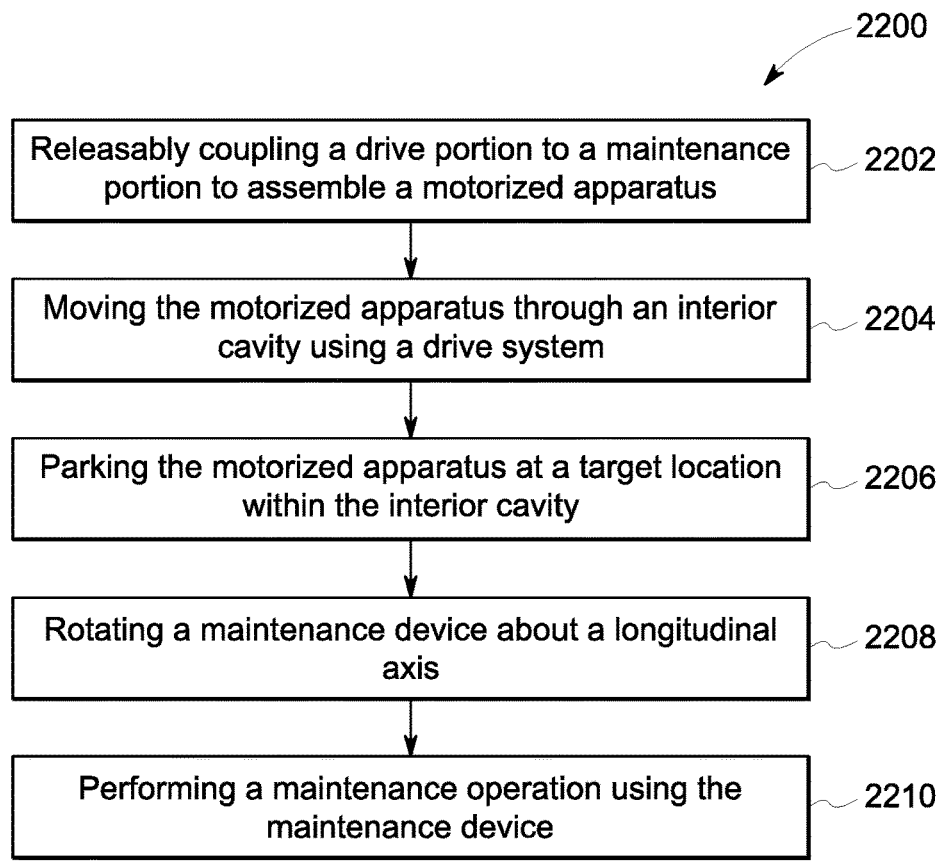
FIG. 22 is a flow chart of an exemplary method of operating the motorized apparatus shown in FIG. 1.

FIG. 22 is a flow chart of an exemplary method 2200 of operating motorized apparatus 400. In reference to FIGS. 8, 12, 15, and 22, method 2200 includes releasably coupling 2202 drive portion 404, 408 to maintenance portion 406 to assemble motorized apparatus 400, moving 2204 motorized apparatus 400 through interior cavity 132 using a drive system, parking 2206 motorized apparatus 400 at a target location within interior cavity 132, rotating 2208 maintenance device 412 about a longitudinal axis, and performing 2210 a maintenance operation using maintenance device 412.

In some embodiments, operating motorized apparatus 400 further includes decoupling maintenance portion 406 from drive portion 404, 408 and coupling a second maintenance portion 406 to drive portion 404, 408. The second maintenance portion 406 may include, for example, a different maintenance device 412.

In some embodiments, operating motorized apparatus 400 includes releasably coupling any number of drive portions 404, 408 and/or maintenance portions 406. For example, operating motorized apparatus 400 may include releasably coupling a maintenance portion 406 to two drive portions 404, 408 such that maintenance portion 406 is positioned between two drive portions 404, 408.

Figure 23:
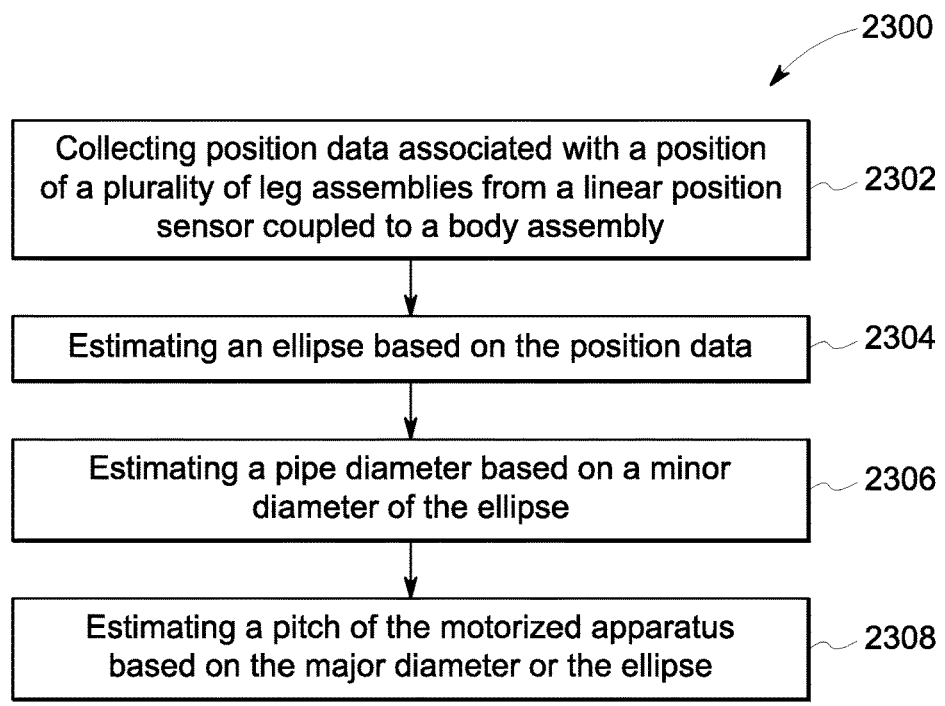
FIG. 23 is a flow chart of an exemplary method of estimating at least one parameter of a pipe using the motorized apparatus shown in FIG. 1.

FIG. 23 is a flow chart of an exemplary method 2300 of estimating at least one parameter of pipe 100 (shown in FIG. 15) using motorized apparatus 400 (shown in FIG. 15). In reference to FIGS. 8, 12, 15, and 21, method 2300 includes collecting 2302 position data associated with a position of a plurality of leg assemblies 416 from a linear position sensor of sensor assembly 422 coupled to body assembly 402. Method 2300 further includes estimating 2304 an ellipse based on the position data, estimating 2306 a pipe diameter based on a minor diameter of the ellipse, and estimating 2308 a pitch of motorized apparatus 400 based on the major diameter or the ellipse.

In some embodiments, method 2300 further includes generating an instruction set based on estimated pitch of motorized apparatus 400. The instruction set may be communicated to actuator assembly 426 to cause actuator assembly 426 to independently actuate the plurality of leg assemblies 416 such that a predetermined pitch is achieved.

Embodiments described herein provide motorized apparatus and systems that useful for maintenance and inspection in a variety of applications. For example, some embodiments are used to maintain steam pipes and include a steam pipe weld repair system. In some embodiments, the steam pipe weld repair system is manually controlled. In further embodiments, the system is at least partly automated. Sensor data and operator inputs, including the selection and rejection of regions to repair will be logged and used to refine algorithms to improve automated performance, reducing operator workload with use.

Embodiments of the motorized apparatus are able to move with protected sensing and maintenance equipment through steam pipes that can range from 6 to 36 inches in diameter with wall temperatures of 350° F. and an ambient atmosphere that is 250° F. with 100% relative humidity. The motorized apparatus adapts to variable pipe diameters using actuated leg assemblies. The actuated leg assemblies keep the motorized apparatus centered radially in the pipe. In addition, the motorized apparatus provides maintenance device linear travel that is twice the diameter of the pipe.

In addition, in some embodiments, a driven wheel is used to contact the pipe's inner wall. In some embodiments, the friction surface of each wheel is high temperature silicone, which has an operating temperature of over 550° F. and has desirable high friction and low thermal conductivity, which helps thermally isolate the motorized apparatus from the hot pipe's inner walls. Neodymium magnet motors may be used throughout the robotic motorized apparatus, including for the drive wheels, motion pod linkage actuators and maintenance device positioning system. Neodymium magnets have a Curie temperature of 589° F., allowing properly sized motors to perform well in relatively high temperature environments without additional cooling.

The arrangement of motion pods in the forward and aft positions of the robotic motorized apparatus allows the motorized apparatus to both push and pull itself through terrain such as expansion joints and diameter reducing couplings. Antagonistically positioned drive wheels allow the motorized apparatus to increase motorized apparatus traction as necessary by pressing harder against the inner wall of the pipe while driving, ensuring that the motorized apparatus can pull 500 feet worth of tether without increasing the weight of the motorized apparatus. The motorized apparatus utilizes actuator force, not motorized apparatus weight, to increase traction.

Because the maintenance device may rotate around an axial track and the direction of gravity relative to the motorized apparatus may be sensed and used to rotate sensor data, there is no preferred roll orientation for the motorized apparatus and therefore there is no need for complicated steering mechanisms on the motorized apparatus to re-orient the motorized apparatus as it traverses pipe sections.

The maintenance device carries sensors and tools required to perform buildup repairs when the motorized apparatus is stationary relative to the pipe and provides a fixed frame of reference for control. For example, in some embodiments, the maintenance device includes an ablation laser processing head for cleaning, a forming gas nozzle for controlling the atmosphere at the worksite, a laser processing head for cladding buildup repairs, a suction nozzle to continually remove debris as it is created, and an array of depth sensors. The full repair tool module of the maintenance device is mounted to a two degree of freedom motion platform that allows the tool to rotate around and two pipe diameters along the motorized apparatus robot's axial track. Distributing the repair tools radially around the module allows us to position each tool relative to the work site by knowing the fixed angular offset between each tool and the depth scanning system. The individual inspection and repair tools are mounted a fixed distance away from the center of rotation so that the nominal working distance from each sensor or tool to the work piece may be maintained. This standoff distance can be manually adjusted to accommodate repairs to different pipe diameters.

The motorized apparatus takes advantage of a gaseous cooling system to ensure electronics are maintained at operational temperatures. The cooling gas also serves as forming gas for the laser processing system and is dispensed through a nozzle to the repair site after circulating through specific regions of the robot's body and maintenance device to provide targeted cooling for electronics. In some embodiments, a metallic additive manufacturing process is used to provide a housing that protects consumer grade electronics in environments up to 700° F. using air cooling and up to 3000° F. using fluid (e.g., air or water) cooling.

A multi-function tether carries the cooling/forming gas to the motorized apparatus along with communications and power transmission. For example, in some embodiments, power is supplied for the maintenance device through two fiber optic cables and electrical power is transmitted through conductors inside of the tether. Welding wire will be fed through a dedicated channel and communications will be performed using standard Ethernet technologies. A vacuum channel will serve as a return path for collected debris allowing for longer operations than would be possible if debris were collected inside of the motorized apparatus. As a result, the tether allows the motorized apparatus to carry less components and have a reduced weight.

In further embodiments, the tether includes a casing having a low-friction, low-thermally conductive applique to reduce the conductive heating between the hot pipe wall and tether and lowering the pulling force required by the motorized apparatus to move the tether long distances. One example applique is a helical coil laced with ceramic beads that provides small surface area contact between the tether, low thermally conductive beads, and the inside of the pipe, reducing heat transfer from the pipe to the tether. In addition, the applique provides low friction rolling and sliding between the bearing beads and therefore the tether and the pipe wall. Wrapping the tether with a low-friction, low-thermal conductivity applique allows the motorized apparatus to operate over greater distances by reducing the conductive heating between the hot pipe wall and tether and lowering the pulling force required by the motorized apparatus to move the tether.

In some embodiments, the motorized apparatus is equipped with two types of sensors; visual and depth. A situational awareness camera will be mounted inside a cooled chamber of an aft motion housing, looking in the axially forward direction. From this position, this sensor will allow the operator to visualize the pipe section that the maintenance device has access to as well as to monitor the motions of the maintenance device during a repair operation. In at least some embodiments, it will be known how far into the pipe the repair site is located before the motorized apparatus enters a pipe to perform repairs. The operator will drive the motorized apparatus quickly to a distance that is just short of the expected repair site, estimating distance by dispensed tether length, and then drive forward slowly while watching the feed from this situational awareness camera to park the motorized apparatus so that the repair site is within the field of regard of the maintenance tool.

The maintenance device carries an array of depth sensors that are housed in cooled cavities. By rotating around and traversing along the axis of the axial track, the array of depth sensors will collect a complete point cloud model of the inside surface of the pipe in coordinates that are fixed to the robot, which is stationary relative to the pipe. This fixed coordinate system, tied through the motorized apparatus to the pipe, allows the motorized apparatus to know its surroundings blindly, making the motorized apparatus robust to challenges such as fogged over lenses. In some embodiments, a process monitoring visual camera is mounted to the laser processing head to allow for visual feedback. Optical windows in front of each camera will be equipped with heaters to minimize fogging. Inertial measurement units mounted inside of cooled housings that are rigidly oriented relative to all sensors will allow the motorized apparatus to measure the direction of gravity and therefore establish the orientation of collected data. Once a comprehensive set of depth data has been collected over the field of regard of the maintenance device, the point cloud will be processed into a surface model using a tessellation algorithm. In parallel, a cylindrical surface will be fit to the point cloud with greater weight applied during the fit to points farthest away from the pipe's bottom dead center. Comparing the tessellated, as measured surface model, to the idealized cylindrical surface model, the system will calculate a volumetric region for cladding buildup in fixed robot coordinates. This model will be analyzed and automatically tapered at the forward and aft boundaries of the maintenance tool's field of regard to ensure that smooth transitions between the original pipe and built up regions are realized. Additionally, this will facilitate a taper between repairs if the motorized apparatus must be moved to address long repair sites.

In some embodiments, laser cleaning and welding of pipes creates high strength repairs. Dispensing forming gas and suctioning debris during cleaning (center frame) removes debris as the repair site is both cleaned and repairs are made. In further embodiments, the motorized apparatus utilizes laser ablation to clean the repair site. For example, some laser ablation systems include a nanosecond scale pulsed laser and a galvanometer scanner to steer the ablating laser beam. The laser ablation system are sized to be incorporated into the maintenance device. In some embodiments, some components of the laser ablation system are located remote from the motorized apparatus such as at a base station of the motorized apparatus.

Following the completion of the cladding repair, the scanning and mapping systems will collect and produce another depth map of the repair site and the ablation system will be used to perform any final cleanup if necessary.

In some embodiments, motorized apparatus is used to perform a maintenance operation for pipe 100, such as a repair of interior surface 138. An example repair sequence includes the following steps:

1. Recognize a need for maintenance over a given stretch of pipe using an independent inspection approach and distance to the repair site from the access port.
2. Prepare an access port by opening the access point and ensuring that the pipe walls are no warmer than 350° F.
3. Maintenance system (Motorized apparatus and base station) are delivered to access site.
4. Motorized apparatus is powered up, consumables are loaded, and system readiness checks are performed.
5. Motorized apparatus is inserted into the prepared access port.
6. Motorized apparatus is commanded to travel a distance that is just shy of the expected repair site.
7. Inspection system configured to scan pipe walls while motorized apparatus drives into pipe with intention of locating pre-identified areas in need of repair.
8. When an area in need of repair is located, motorized apparatus position is tuned to ensure region in need of repair falls within the field of regard of the repair tool
9. Operator verifies motorized apparatus position relative to repair area by looking at sensor data displayed on base station.
10. Motorized apparatus parks at the selected location relative to the pipe and region in need of repair.
11. Inspection system performs a detailed scan (including depth) of the workspace, with sensed information traceable back to the location of the motorized apparatus relative to the pipe.
12. Operator reviews workspace scan and selects/confirms regions for surface preparation.
13. Repair tool is driven relative to the motorized apparatus-based frame of reference to prepare selected regions for buildup repair.
14. Laser ablation system cleans surface to be repaired while debris management system removes loosened material.
15. Inspection system performs detailed scan (including depth) of prepared surfaces.
16. Operator selects/confirms locations of specific sites to perform repairs (all relative to motorized apparatus's frame of reference which is firmly fixed to the pipe because the motorized apparatus is parked)
17. Toolpath generated for repair tool to perform buildup repair based on captured 3D model and operator inputs.
18. Operator reviews toolpath and accepts or returns to step 15 for refinement.
19. Repair tool follows toolpath. It is possible to perform the operation with little or no visual feedback because tool is controlled relative to the motorized apparatus's frame of reference and that is fixed to the pipe.
20. Inspection system performs detailed scan (including depth) of built-up surfaces.
21. System analyzes generated 3D map and generates recommendation for rework or repair completion.
22. Operator reviews system recommendation and returns to step 16 or proceeds.
23. Cleaning tool performs final cleanup of entire reachable area.
24. If more repairs are needed, return to step 6, otherwise, motorized apparatus backs out of pipe, maintenance system is removed, and pipe is returned to service.

An exemplary technical effect of the methods, systems, and apparatus described herein includes at least one of: (a) reducing the time to inspect and/or repair pipes; (b) enabling inspection and repair of an interior cavity of a pipe at greater distances from an access opening; (c) increasing the information that is available during a maintenance operation of an interior cavity of a pipe; (d) providing an apparatus configured to withstand relatively high temperatures and pressures within a pipe; (e) providing an apparatus that is configured to fit within a range of pipe sizes and traverse different transitions; and (f) providing precise positioning of a maintenance device within a pipe.

Exemplary embodiments of systems and methods for use in maintaining pipes are described above in detail. The methods and systems are not limited to the specific embodiments described herein, but rather, components of systems and/or steps of the methods may be utilized independently and separately from other components and/or steps described herein. For example, the method may also be used in combination with other components, and are not limited to practice only with the pipes as described herein. Rather, the exemplary embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in maintaining a pipe having a sidewall defining an interior cavity, said system comprising:
    a motorized apparatus sized to fit within the interior cavity and configured to travel along the pipe through the interior cavity, said motorized apparatus comprising:
        a body assembly sized to fit within the interior cavity and configured to travel along the pipe through the interior cavity, said body assembly comprising a first end and a second end, and extending along a longitudinal axis;
        a plurality of leg assemblies coupled circumferentially around said body assembly, wherein each leg assembly of said plurality of leg assemblies comprises a leg member comprising a first end, a second end, and a telescoping portion extending between said first end and said second end;
        an actuator assembly coupled to each said leg assembly of said plurality of leg assemblies and configured to independently actuate each said leg assembly of said plurality of leg assemblies to adjust a position of each said leg assembly of said plurality of leg assemblies, wherein said leg member of each said leg assembly of said plurality of leg assemblies is coupled to said body assembly and configured to move along the longitudinal axis of said body assembly when said actuator assembly actuates said associated leg assembly; and at least one sensor configured to collect information associated with the position of each said leg assembly of said plurality of leg assemblies; and a controller communicatively coupled to said motorized apparatus and configured to receive the information from said sensor, wherein said controller is configured to determine at least one of a pipe diameter and a pitch of said motorized apparatus based on the information from said at least one sensor.

2. The system in accordance with claim 1, wherein said controller is further configured to map an orientation of said motorized apparatus based on the information received from said at least one sensor.

3. The system in accordance with claim 2, wherein said controller is further configured to generate an ellipse based on the information received from said at least one sensor and estimate a pitch of said motorized apparatus based on a major diameter of the ellipse and estimate a pipe diameter based on a minor diameter of the ellipse.

4. The system in accordance with claim 1, wherein said body assembly comprises a support comprising a first end and a second end, and a housing comprising a first end and a second end, wherein said housing second end is coupled to said support first end, and wherein said first member second end is movably coupled to said support.

5. The system in accordance with claim 4, wherein the information from said at least one sensor is associated with a position of said second end of said leg member along the longitudinal axis.

6. The system in accordance with claim 1, wherein said at least one leg member of each said leg assembly of said plurality of leg assemblies comprises a first leg member and a second leg member, and wherein each said leg assembly of said plurality of leg assemblies further comprises a drive mechanism coupled to at least one of said first leg member and said second leg member and configured to interact with the sidewall as said body assembly travels along the pipe.

7. The system in accordance with claim 1, wherein said at least one sensor comprises a plurality of linear position sensors, and wherein each linear position sensor of said plurality of linear position sensors is coupled to one of said telescoping portions.

8. The system in accordance with claim 1, wherein said controller is further configured to send instructions to said actuator assembly based on at least one of the pipe diameter and the pitch of the motorized apparatus.

9. The system in accordance with claim 1, wherein said leg member of each said leg assembly of said plurality of leg assemblies comprises a first leg member, wherein each said leg assembly of said plurality of leg assemblies further comprises a second leg member coupled to said body assembly and said associated first leg member.

10. A motorized apparatus for use in maintaining a pipe having a sidewall defining an interior cavity, said motorized apparatus comprising:

a body assembly sized to fit within the interior cavity and configured to travel along the pipe through the interior cavity, said body assembly comprising a first end and a second end, and extending along a longitudinal axis;

a plurality of leg assemblies coupled circumferentially around said body assembly, wherein each leg assembly of said plurality of leg assemblies comprises:

a first leg member comprising a first end, a second end, and a telescoping portion extending between said first end and said second end, wherein said second end of said first leg member is coupled to said body assembly and configured to move along the longitudinal axis of said body assembly;

a second leg member coupled to said body assembly and said first leg member; and a drive mechanism coupled to at least one of said first leg member and said second leg member and configured to interact with the sidewall as said body assembly travels along the pipe; and an actuator assembly coupled to each said leg assembly of said plurality of leg assemblies and configured to independently actuate each said leg assembly of said plurality of leg assemblies to adjust a position of each said leg assembly of said plurality of leg assemblies; and at least one sensor configured to collect information associated with a position of said second end of each said leg assembly of said plurality of leg assemblies and provide the information to a controller for determining at least one of a pipe diameter and a pitch of said body assembly.

11. The motorized apparatus in accordance with claim 10, wherein each said leg assembly of said plurality of leg assemblies further includes a joint configured to rotatably couple said first end of said first leg member to said second leg member such that said joint moves radially outward from said body assembly as said second end of said first member of said associated leg assembly moves along the longitudinal axis of said body assembly.

12. The motorized apparatus in accordance with claim 10, wherein said body assembly comprises a support comprising a first end and a second end, and a housing comprising a first end and a second end, wherein said housing second end is coupled to said support first end, and wherein said first member second end is movably coupled to said support.

13. The motorized apparatus in accordance with claim 10, wherein said drive mechanism comprises at least one wheel configured to contact the sidewall, and wherein each said telescoping portion of said plurality of leg assemblies is configured to move in response to a force on said at least one wheel of said associated leg assembly.

14. The motorized apparatus in accordance with claim 13, wherein said at least one sensor comprises a plurality of linear position sensors coupled to said telescoping portions and configured to detect movement of said telescoping portions.

15. The motorized apparatus in accordance with claim 10, wherein the information from said at least one sensor includes a position of said second end of said first leg member along the longitudinal axis.

16. A method for maintaining a pipe having a sidewall defining an interior cavity, said method comprising:

positioning a motorized apparatus within the interior cavity, the motorized apparatus including:

a body assembly sized to fit within the interior cavity and configured to travel along the pipe through the interior cavity; and a plurality of leg assemblies coupled circumferentially around said body assembly;

positioning, using an actuator assembly coupled to each said leg assembly of said plurality of leg assemblies, each leg assembly of the plurality of leg assemblies relative to the body assembly, wherein each leg assembly of the plurality of leg assemblies includes a telescoping portion, wherein said actuator assembly is configured to independently actuate each said leg assembly of said plurality of leg assemblies;

collecting information associated with a position of said leg assemblies from at least one sensor coupled to the body assembly; and mapping an orientation of the motorized apparatus based on the information from the at least one sensor.

17. The method in accordance with claim 16, wherein the at least one sensor includes a plurality of sensors, each sensor of the plurality of sensors coupled to one of the telescoping portions, the method further comprising:

receiving the information from the plurality of sensors; and mapping an orientation of said motorized apparatus based on the information.

18. The method in accordance with claim 17, wherein mapping an orientation of the motorized apparatus based on the information from the at least one sensor comprises estimating an ellipse based on the information, and further estimating a pipe diameter based on a minor diameter of the ellipse.

19. The method in accordance with claim 17, wherein mapping an orientation of the motorized apparatus based on the information from the at least one sensor comprises estimating an ellipse based on the information, and further estimating a pitch of the motorized apparatus based on a major diameter of the ellipse.

20. The method in accordance with claim 16 further comprising:

generating an instruction set based on at least one of the estimated pipe diameter and the pitch of the motorized apparatus;

communicating the instruction set to the actuator assembly; and positioning the plurality of leg assemblies using the actuator assembly in accordance with the instruction set, wherein the instruction set causes the actuator assembly to independently actuate the plurality of leg assemblies such that a predetermined pitch is achieved.

* * * * *